(12) United States Patent
Favaretto

(10) Patent No.: US 10,305,075 B2
(45) Date of Patent: May 28, 2019

(54) BATTERY MODULE FOR A SYSTEM FOR THE STORAGE OF ELECTRICAL ENERGY FOR AN ELECTRIC DRIVE VEHICLE

(71) Applicant: Ferrari S.p.A., Modena (IT)

(72) Inventor: Fabrizio Favaretto, Formigine (IT)

(73) Assignee: Ferrari S.p.A., Modena (IT)

( * ) Notice: Subject to any disclaimer, the term of this patent is extended or adjusted under 35 U.S.C. 154(b) by 223 days.

(21) Appl. No.: 15/635,845

(22) Filed: Jun. 28, 2017

(65) Prior Publication Data

US 2018/0006282 A1 Jan. 4, 2018

(30) Foreign Application Priority Data

Jun. 29, 2016 (IT) .................. 102016000067184

(51) Int. Cl.
*H01M 2/10* (2006.01)
*H01M 10/613* (2014.01)
*H01M 10/625* (2014.01)
*H01M 2/12* (2006.01)
*H01M 2/20* (2006.01)
*H01M 10/42* (2006.01)
*H01M 10/6567* (2014.01)
*H01M 10/643* (2014.01)
*B60L 58/26* (2019.01)
(Continued)

(52) U.S. Cl.
CPC .......... *H01M 2/1077* (2013.01); *B60L 50/64* (2019.02); *B60L 58/26* (2019.02); *H01M 2/1264* (2013.01); *H01M 2/206* (2013.01); *H01M 10/425* (2013.01); *H01M 10/613* (2015.04); *H01M 10/625* (2015.04); *H01M 10/643* (2015.04); *H01M 10/6567* (2015.04); *B60K 1/04* (2013.01); *B60K 2001/0405* (2013.01); *H01M 2010/4271* (2013.01); *H01M 2220/20* (2013.01)

(58) Field of Classification Search
CPC ............. H01M 2/1077; H01M 10/613; H01M 10/625; H01M 10/643; H01M 10/6567; H01M 2/1264; H01M 2/206; H01M 10/425; B60L 50/64; B60L 58/26; B60K 1/04
See application file for complete search history.

(56) References Cited

U.S. PATENT DOCUMENTS

2011/0008667 A1   1/2011  Kwag et al.
2012/0100399 A1   4/2012  Adachi et al.
(Continued)

FOREIGN PATENT DOCUMENTS

EP   2 325 034 A1   5/2011
EP   2 365 560 A1   9/2011
EP   2 626 923 A1   8/2013

*Primary Examiner* — Helen Oi K Conley
(74) *Attorney, Agent, or Firm* — Blank Rome LLP

(57) ABSTRACT

A battery module for a system for the storage of electrical energy for an electric drive vehicle. The battery module has: a group of chemical batteries arranged parallel to and beside one another; at least two connection plates which rest against opposite ends of the group of chemical batteries so as to electrically connect the poles of the chemical batteries to one another; two support bodies coupled to opposite ends of the group of chemical batteries so as to provide the chemical batteries with a stable mechanical support; two lids, which are coupled to the support bodies so as to create respective collecting chambers having at least one draining opening; and at least two tie rods, which are arranged on opposite sides of the battery module and tie together the lids and the support bodies in a packed manner.

17 Claims, 25 Drawing Sheets

(51) Int. Cl.
 B60L 50/64 (2019.01)
 B60K 1/04 (2019.01)

(56) References Cited

U.S. PATENT DOCUMENTS

2012/0107663 A1  5/2012  Burgers et al.
2015/0086829 A1  3/2015  Sun et al.

BATTERY MODULE FOR A SYSTEM FOR THE STORAGE OF ELECTRICAL ENERGY FOR AN ELECTRIC DRIVE VEHICLE

PRIORITY CLAIM

This application claims priority from Italian Patent Application No. 102016000067184 filed on Jun. 29, 2016, the disclosure of which is incorporated by reference.

FIELD OF THE INVENTION

The present invention relates to a battery module for an electric energy storage system for an electric drive vehicle.

The present invention advantageously applies to a hybrid propulsion road vehicle, to which the following specification will make explicit reference without thereby losing generality.

DESCRIPTION OF THE RELATED ART

A hybrid vehicle comprises an internal combustion heat engine, which transmits the driving torque to the driving wheels by means of a transmission provided with a gearbox, and at least one electric machine, which is mechanically connected to the driving wheels and electrically connected to an electric energy storage system. Normally, the electric energy storage system comprises a pack of chemical batteries, which are connected to each other in parallel and in series.

Patent application EP2626923A1 describes an electric energy storage system for an electric drive vehicle; this storage system is provided with a pack of chemical batteries connected to each other in parallel and in series, each of which has a cylindrical shape with a central axis of symmetry and is provided with a respective electrochemical cell. The chemical batteries are arranged inside a plastic support matrix, which provides a mechanical support for said chemical batteries. However, the arrangement of the chemical batteries in the electric energy storage system described in patent application EP2626923A1 has some drawbacks, since it does not allow the storage system to take "irregular" shapes (i.e. "complex" shapes) in a simple manner, in order to be able to adapt the shape of the storage system to the shape of the available space inside the vehicle so that the available space is taken up as fully as possible.

Patent application US2011008667A1 discloses a battery module for an electric energy storage system in which two opposite housings are provided, each of which has a series of guide pins which are arranged parallel to the chemical batteries and between said chemical batteries; each housing is closed on the outside by an insulating plate provided with coupling holes in which the tips of the guide pins are inserted. However, the battery module described in patent application US2011008667A1 has some drawbacks, as the manufacture of the individual parts is relatively complex due to their complicated shape and because the overall mechanical robustness is poor.

Patent applications EP2365560A1, US2015086829A1, US2012100399A1, US2012107663A1 also provide additional examples of battery modules for an energy storage system.

SUMMARY OF THE INVENTION

The object of the present invention is to provide a battery module for an electric energy storage system for an electric drive vehicle, which battery module is free from the drawbacks described above and, at the same time, is easy and inexpensive to manufacture. According to the present invention, a battery module for an electric energy storage system for an electric drive vehicle is provided as claimed in the appended claims.

BRIEF DESCRIPTION OF THE DRAWINGS

The present invention will now be described with reference to the accompanying drawings, which illustrate some non-limiting embodiments thereof, in which.

PREFERRED EMBODIMENTS OF THE INVENTION

Figure 1:
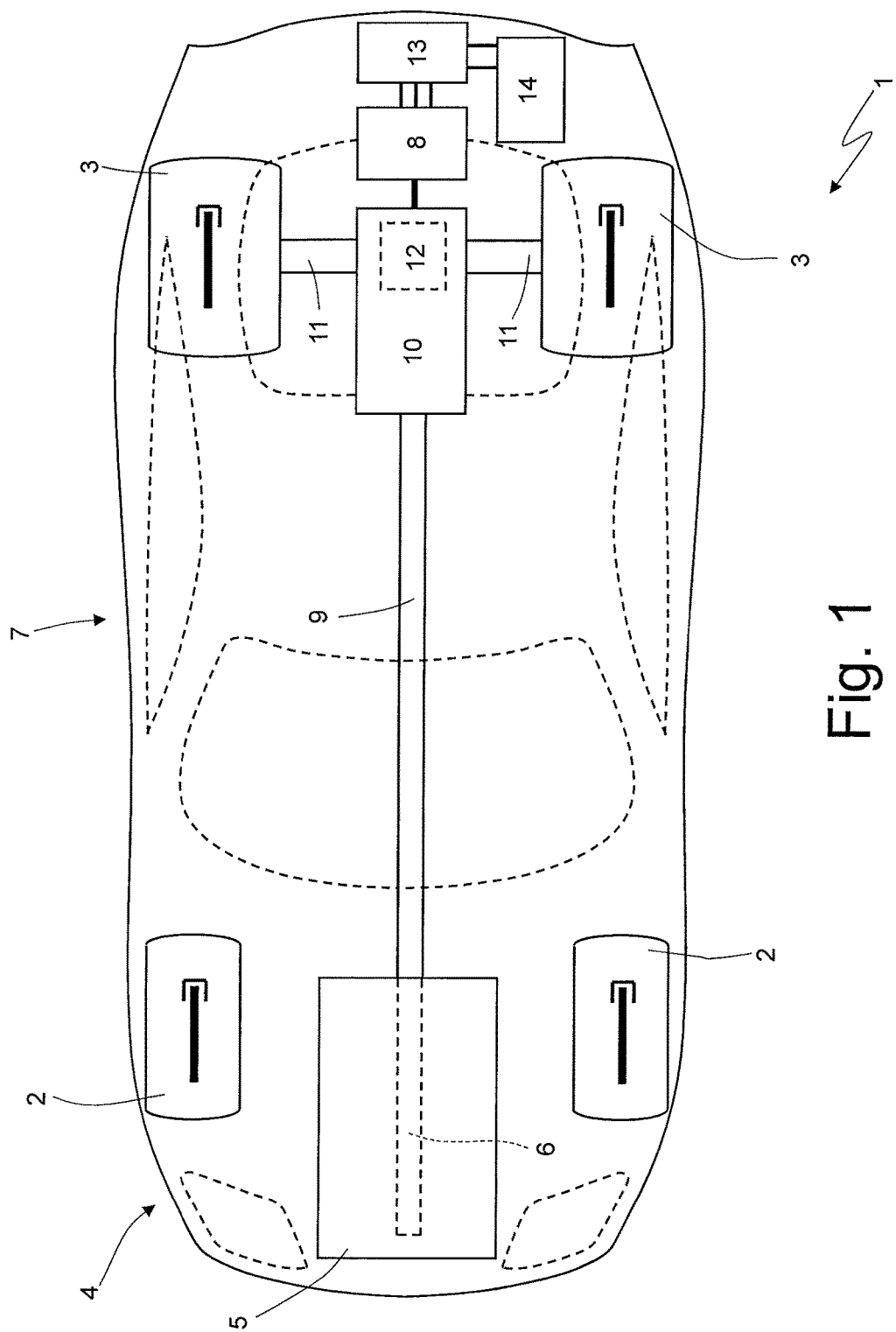
FIG. 1 is a schematic plan view of a hybrid propulsion road vehicle.

In FIG. 1, the numeral 1 indicates, as a whole, a hybrid propulsion road vehicle equipped with two front wheels 2 and two rear driving wheels 3, which receive the driving torque from a hybrid motor propulsion system 4.

The hybrid motor propulsion system 4 comprises an internal combustion heat engine 5, which is arranged in the front and is provided with a drive shaft 6, an automatic transmission 7, which transmits the driving torque generated by the internal combustion engine 5 to the rear driving wheels 3, and an electric machine 8 which is mechanically connected to the transmission 7 and is reversible (i.e. it can work both as an electric motor by absorbing electric energy and generating a mechanical driving torque, and as an electric generator by absorbing mechanical energy and generating electric energy).

The transmission 7 comprises a transmission shaft which, on one side, is angularly integral with the drive shaft 6 and, on the other side, is mechanically connected to a dual clutch transmission 10, which is arranged at the back and transmits the motion to the rear driving wheels 3 by means of two axle shafts 11 that receive the motion from a differential 12. The electric machine 8 is mechanically connected to the transmission 10, and in particular, is angularly integral with a primary gear shaft 10; as for the mode of connection between the electric machine 8 and the dual clutch transmission 10, reference should be made, for example, to what is described in patent application EP2325034A1.

Figure 2:
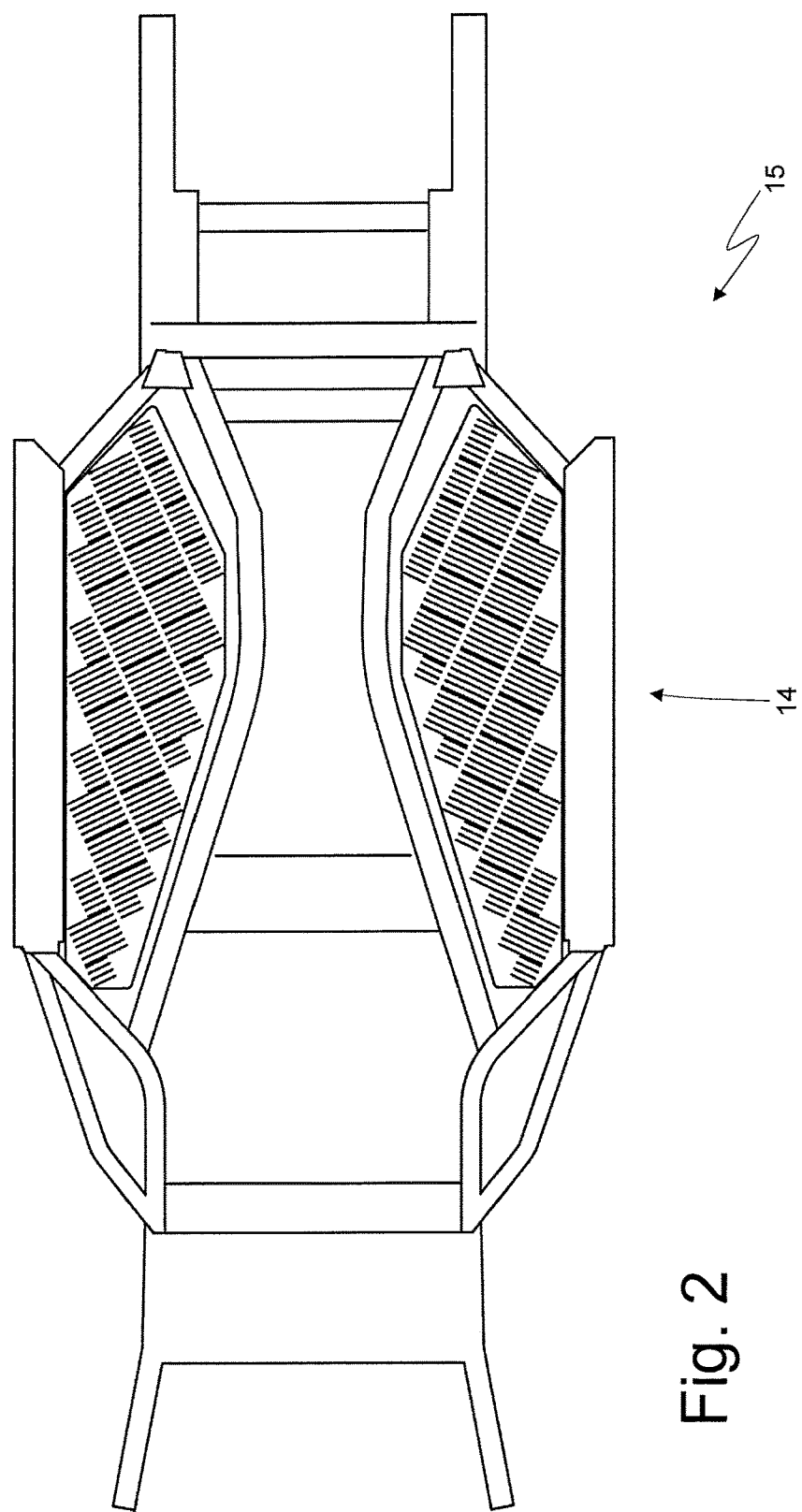
FIG. 2 is a schematic plan view of a chassis of the road vehicle of FIG. 1 highlighting an electric energy storage system provided in accordance with the present invention.
Figure 3:
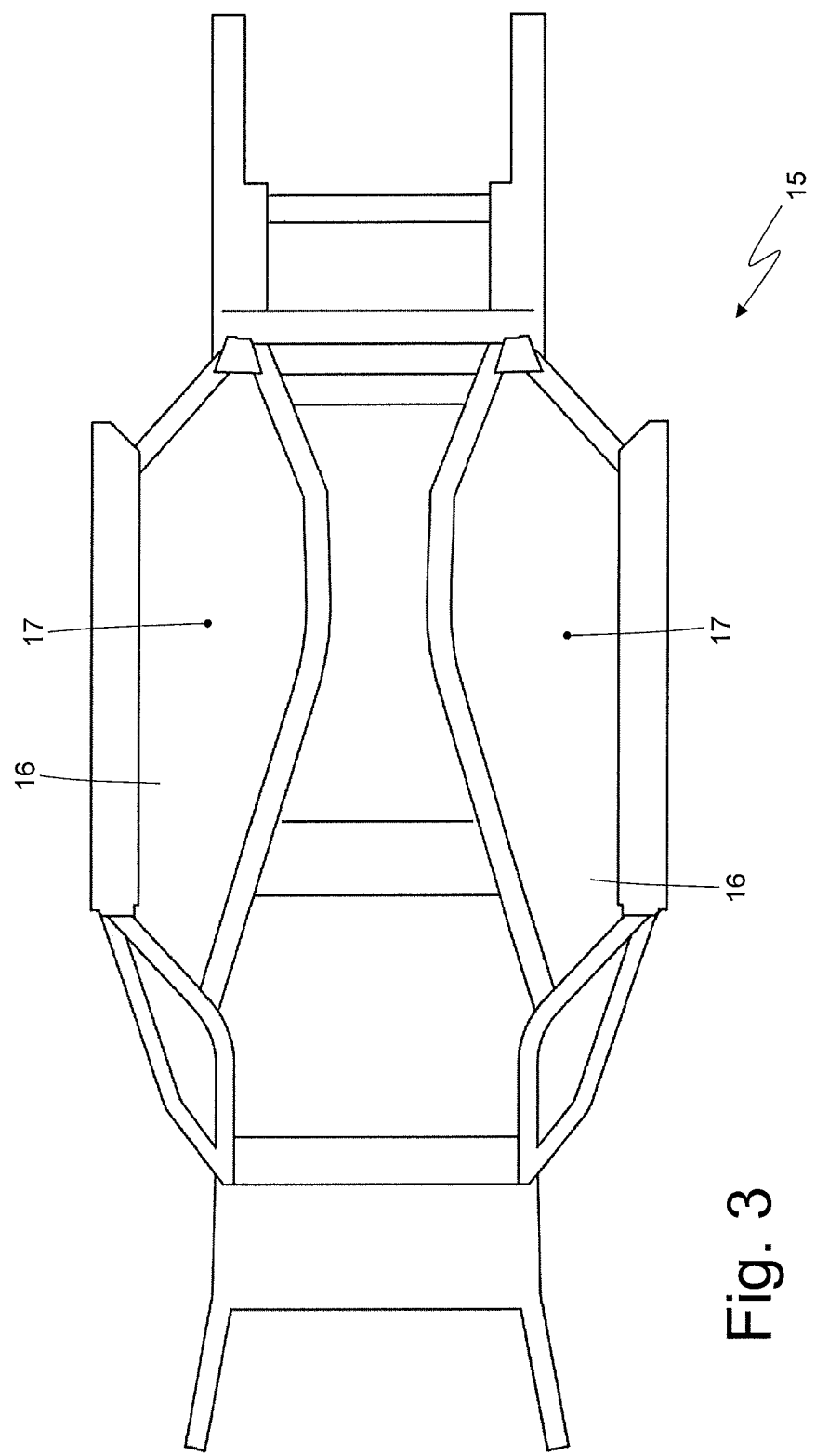
FIG. 3 is a schematic plan view of the chassis of FIG. 2 without the electric energy storage system.
Figure 4:
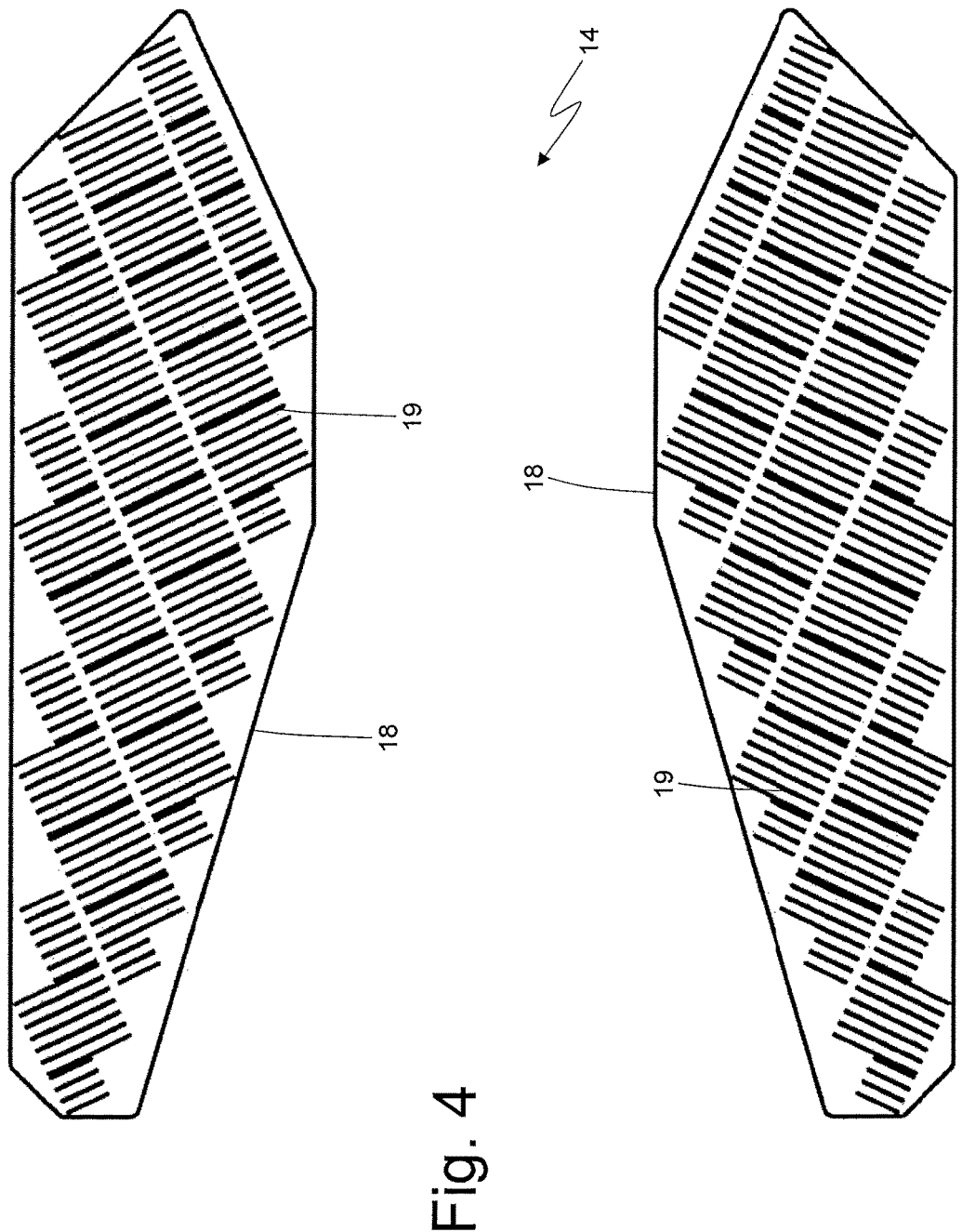
FIG. 4 is a schematic plan view, in enlarged scale, of the electric energy storage system alone, shown in FIG. 2.

As shown in FIGS. 2 and 3, the road vehicle 1 is provided with a chassis 15 comprising a floor 16 (partially and schematically shown in FIG. 3) which constitutes a bottom wall of the passenger compartment; the floor 16 accommodates two housings 17 (shown in FIG. 3) which house the storage system 14 (therefore the storage system 14 is supported by the floor 16). As shown in FIG. 4, the storage system 14 comprises two containers 18 (typically made of a plastic material that is thermally conductive and electrically insulating), each of which is inserted inside a corresponding housing 17 and therefore has the same shape of the housing 17 itself.

Each container 18 holds a pack of chemical batteries 19, which are connected to each other in parallel and in series and comprise respective electrochemical cells, which are capable of converting the stored chemical energy into electric energy and vice versa. According to a preferred embodiment, the electrochemical cells are of the lithium ion type ("Li-Ion").

Figure 5:
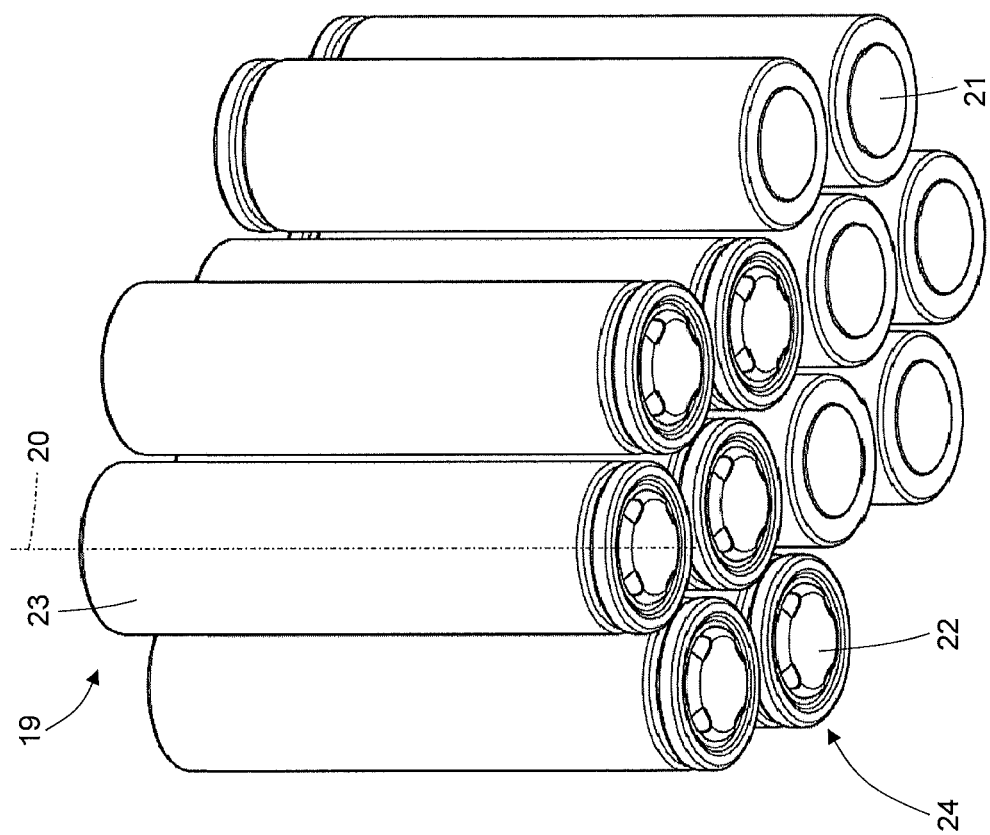
FIG. 5 is a perspective and schematic view of a group of chemical batteries which form a battery module of the electric energy storage system of FIG. 2.

As shown in FIG. 5, each chemical battery 19 has a cylindrical shape with a central axis of symmetry 20, and a positive pole 22 at one end and a negative pole 21 at an opposite end. Each chemical battery 19 comprises a cylindrical electrochemical cell (not shown), and an outer shell 23, which has a cylindrical shape, houses on the inside the electrochemical cell while maintaining said electrochemical cell compressed, and is made of a (typically metallic) material with high mechanical strength. Each chemical battery 19 is provided with a safety valve 24 (i.e. a vent or pressure relief valve) which is arranged at a base of the outer shell 23 near the positive pole 22 -(but could also be arranged in the opposite position at the negative pole 21) and is calibrated to open when the pressure inside the outer shell 23 exceeds a predetermined safety pressure (i.e. in case of thermal drift of the chemical battery 19 which causes the outflow of hot fluids); in other words, the safety valve 24 is a mechanical maximum pressure valve which opens when the pressure inside the outer shell 23 is too high, so as to avoid a violent explosion of the outer casing 23 itself.

Figure 6:
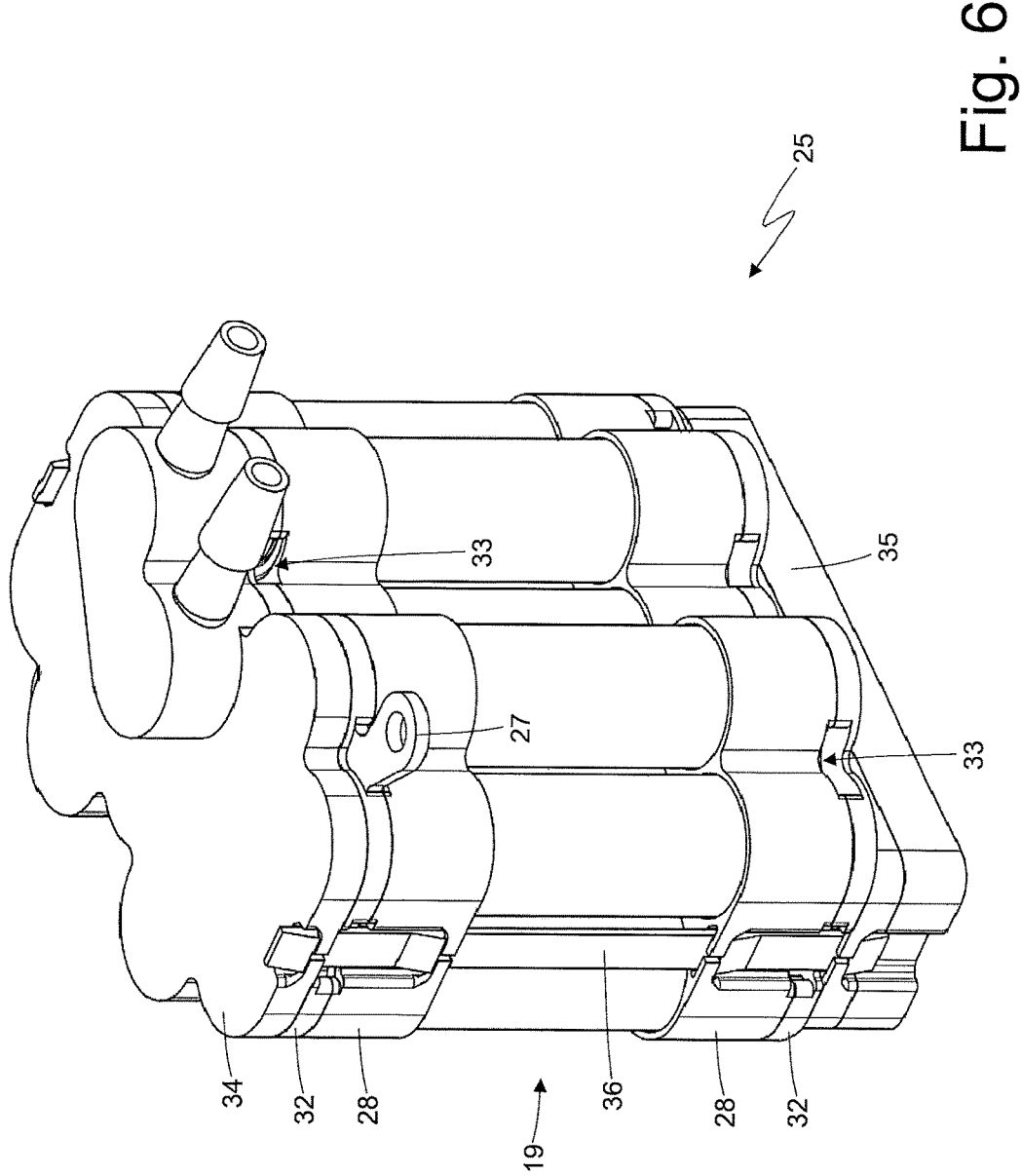
FIGS. 6 and 7 are two different perspective views of a battery module of the electric energy storage system of FIG. 2.
Figure 7:
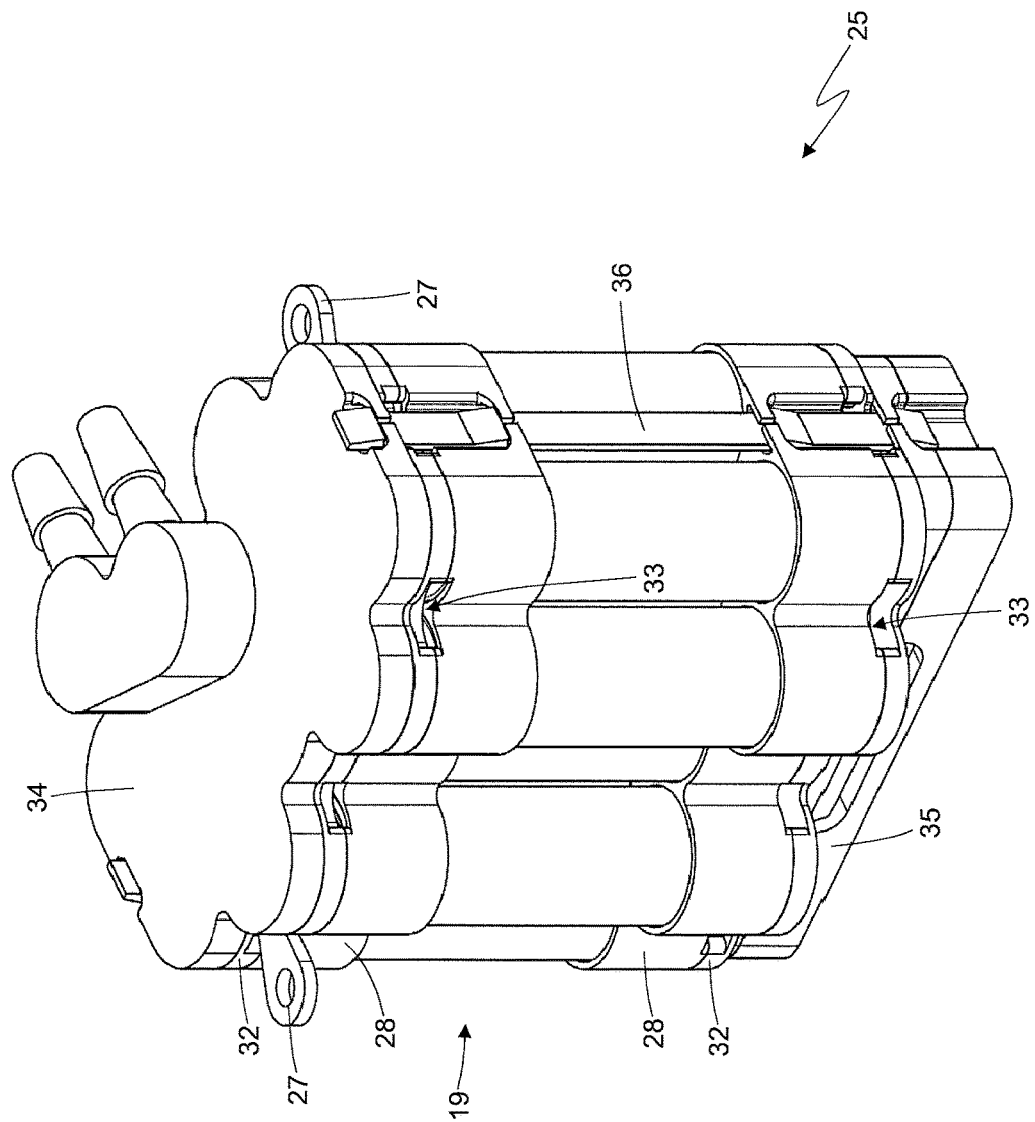
Figure 8:
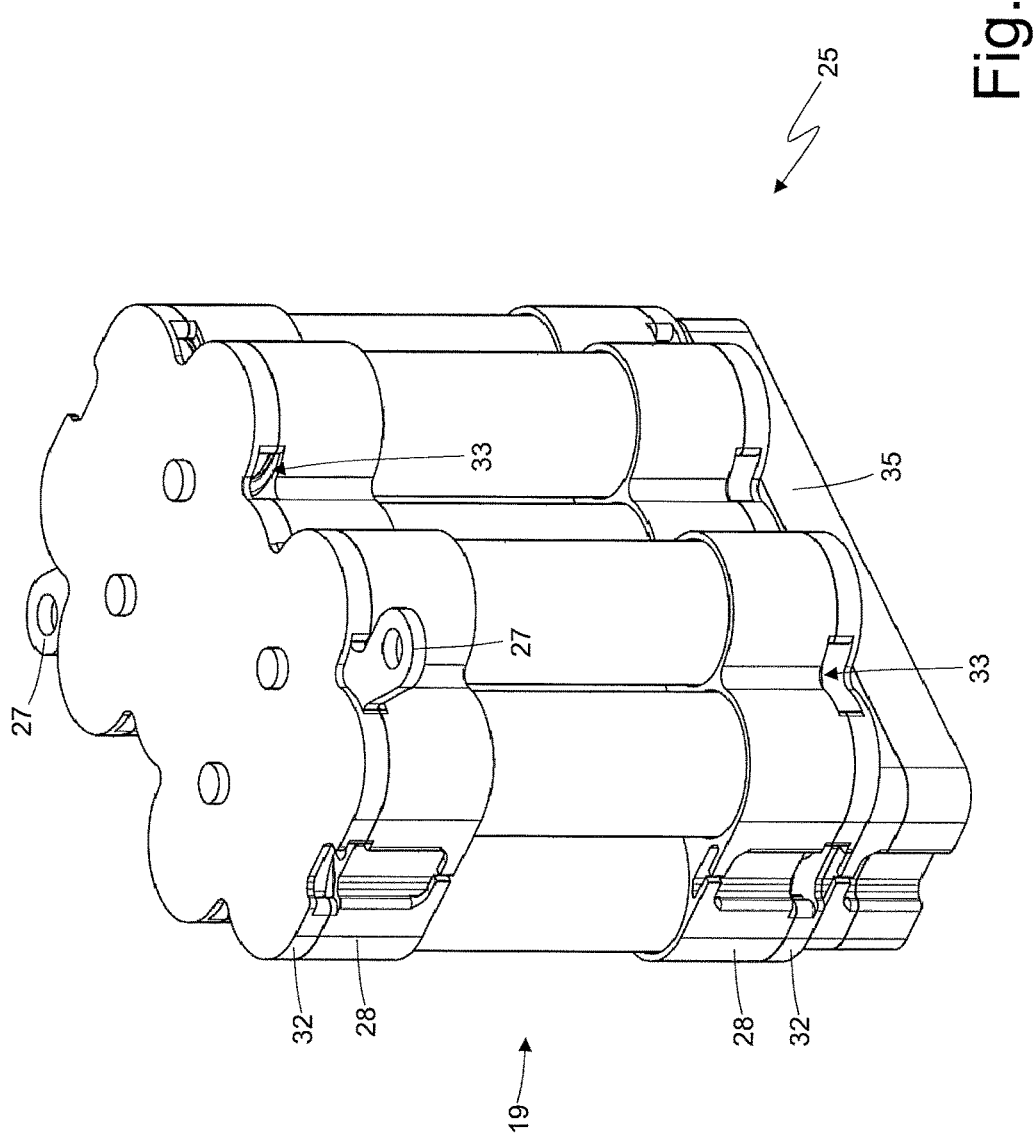
FIGS. 8-11 are four perspective views of the battery module of FIGS. 6 and 7 with the progressive removal of elements.

As shown in FIGS. 6 and 7, the storage system 14 comprises a plurality of battery modules 25 (only one of which is shown in FIGS. 6 and 7), each of which houses a group of chemical batteries 19 (ten chemical batteries 19 in the non-limiting embodiment illustrated in the attached figures); in other words, the storage system 14 is formed by a plurality of battery modules 25 (only one of which is shown in FIGS. 6 and 7) electrically connected to each other in series or in parallel and arranged so as to attain a complex shape (schematically shown in FIGS. 2 and 4) so that all the available space on the floor 16 of the road vehicle 1 can be taken up effectively. The storage system 14 is formed in a modular fashion by arranging side by side multiple battery modules 25, each of which carries a certain number of chemical batteries 19 (ten chemical batteries 19 in the example illustrated in the attached figures). The battery modules 25 may not all be the same: some battery modules 25 may house multiple chemical batteries 19 (e.g., ten, twelve or fifteen chemical batteries 19), while other battery modules 25 may house fewer chemical batteries 19 (e.g., five, six or eight chemical batteries 19) in order to be able to fully exploit all the available space on the floor 16 of the road vehicle 1 (i.e. to better adapt the overall shape of the storage system 14 to the normally irregular shape of the container 18 of the storage system 14).

As shown in FIGS. 9, 14, 15, 17 and 18, each battery module 25 comprises at least two connection plates 26, which rest against opposite ends of the group of chemical batteries 19, so as to electrically connect the poles 21 and 22 of the chemical batteries 19 to one another, and are provided with two respective terminals 27, which project outwards from the battery module 25 and are designed to establish an external electrical connection of the battery module 25. In the embodiment illustrated in the attached figures, three connection plates 26 are provided (two on one side equipped with terminals 27 and only one on the opposite side devoid of terminals 27) so as to form two subgroups of five chemical batteries 19 each, in which the five chemical batteries 19 are connected to each other in parallel; the two subgroups of five chemical batteries 19 each are connected to each other in series. Obviously, as well shown in FIG. 5, within each subgroup, all the chemical batteries 19 have the same orientation, while in the two subgroups, the chemical batteries 19 have opposite orientations. According to a different, yet perfectly equivalent, embodiment, all the chemical batteries 19 have the same orientation and there are only two connection plates 26, which rest against opposite ends of the group of chemical batteries 19, and all the chemical batteries 19 are connected to each other in parallel. Obviously, there are also other ways of connecting the chemical batteries 19 of the battery module 25.

Figure 19:
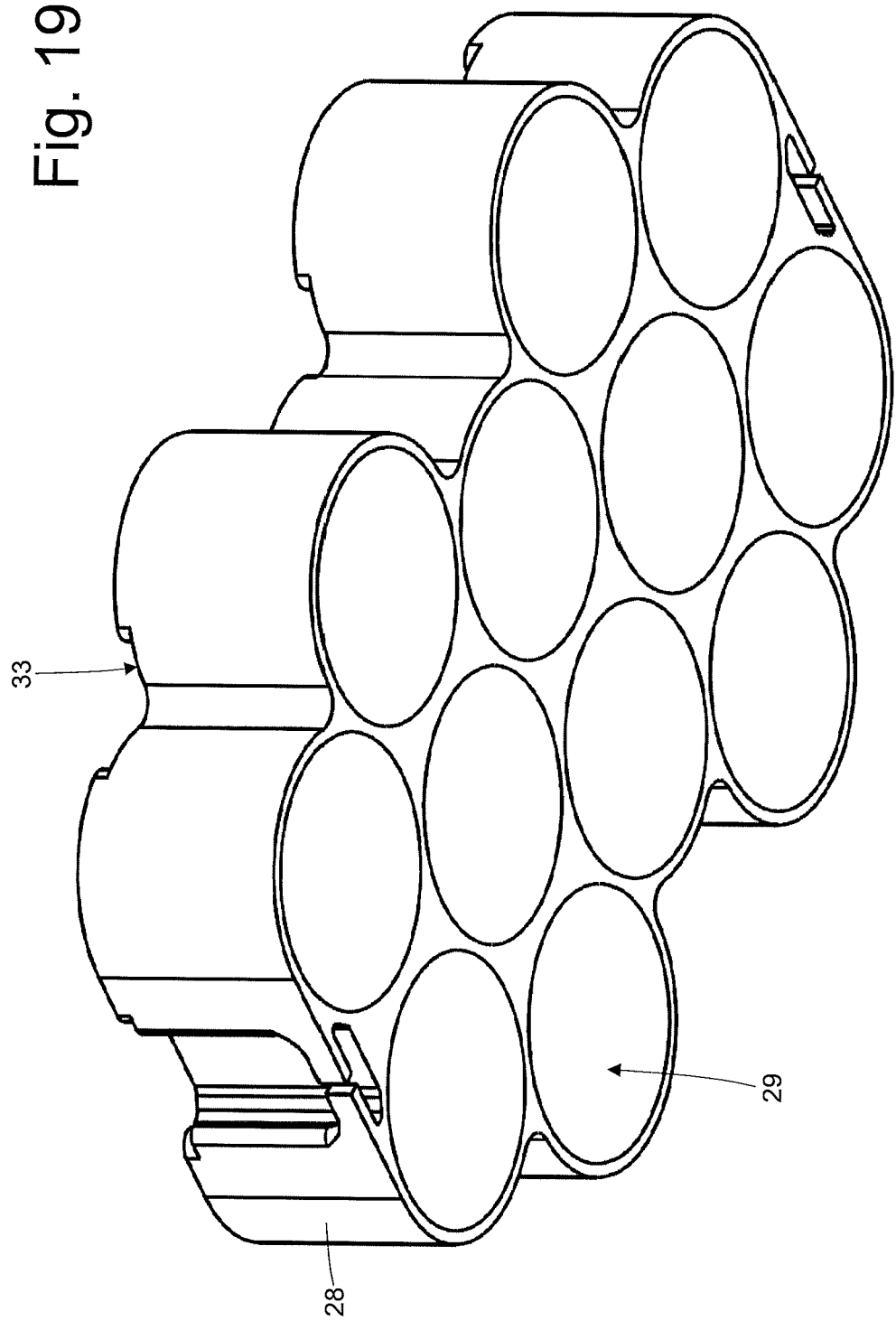
FIGS. 19 and 20 are two perspective views of a support body of the battery module of FIGS. 6 and 7.

The battery module 25 comprises two support bodies 28 coupled to opposite ends of the group of chemical batteries 19 so as to provide the chemical batteries 19 with a stable mechanical support. As better illustrated in FIGS. 19 and 20, each support body 28 has a plurality of tubular seats 29, which house, on the inside, the chemical batteries 19 (i.e. respective ends of the chemical batteries 19), and a plurality of locking elements 30, which are arranged in the area of an outer surface of the support body 28 and hold the chemical batteries 19 inside the corresponding tubular seats 29. In other words, the locking elements 30 of each support body 28 are arranged in the area of an outer end of the support body 2 and prevent the escape of the chemical batteries 19 from the outer end of the support body 28; hence, the locking elements 30 prevent the chemical batteries 19 from coming out of the outer ends of the support bodies 28 so that the chemical batteries 19 are "pinched" between the locking elements 30 of the two support bodies 28.

In each support body 28, the locking elements 30 are arranged both at the outer edge of the support body 28 (and have the shape of a circular sector), and in the central part of the support body 28 (and have the shape of a circle); preferably, each locking element 30 arranged in the central part of a support body 28 is arranged astride two adjacent tubular seats 29 (alternatively, each locking element 30 arranged in the central part of a support body 28 could be arranged astride three adjacent tubular seats 29, or could only be arranged at a single tubular seat 29).

Each support body 28 also has a flat seat 31, which is arranged in the area of the outer surface of the support body 28 and houses at least one corresponding connection plate 26 (in the embodiment illustrated in the attached figures, a flat seat 31 houses two connection plates 26, which are adjacent yet well separated, and the other flat seat 31 houses a single connection plate 26). Preferably, but not necessarily, within each flat seat 31, the locking elements 30 arranged at the outer edge of the support body 28 also form side edges, which laterally retain the corresponding connection plate 26.

As shown in FIGS. 6 and 7, each battery module 25 comprises two lids 32, which are (preferably sealingly) coupled to the support bodies 28 so as to create respective collecting chambers having a plurality of draining openings 33 to drain hot fluids flowing out of the safety valve 24 of a chemical battery 19 in case of thermal drift of the chemical battery 19. In the embodiment illustrated in the attached figures, each collecting chamber (bounded on one side by a corresponding support body 28 and bounded on the other side by a corresponding lid 32) has four draining openings 33 arranged along the two long sides (of course, any other number of draining openings 33 could be provided with any other type of arrangement of said draining openings 33); preferably, each draining opening 33 is formed, in part, through a window in a side wall of the corresponding support body 28, and for the remaining part, through a window in a side wall of the corresponding lid 32 (i.e., each draining opening 33 is partially formed through the corresponding lid 32 and partially formed through the support body 28). According to a preferred (yet non-limiting) embodiment illustrated in the attached figures, each terminal 27 of a connection plate 26 projects from the corresponding collecting chamber through a draining opening 33.

As shown in FIGS. 6 and 7, each battery module 25 comprises a cooling device 34, which is designed to remove heat and rests against the outer surface of a lid 32. In the embodiment illustrated in the attached figures, the cooling device 34 comprises a hydraulic circuit through which a refrigerant liquid can flow; note in FIG. 6 the delivery port and the return port for the circulation of the refrigerant liquid within the cooling device 34.

As shown in FIGS. 6 and 7, each battery module 25 comprises a local control unit 35 (called BMC—"Battery Module Control"), which controls the operation of the chemical batteries 19 of the battery module 25 and rests against the outer surface of a lid 32 on the opposite side of the cooling device 34. In other words, the cooling device 34 and the local control unit 35 rest against respective lids 32 so as to be located at the opposite ends of the battery module 25. The local control unit 35 determines, for each chemical battery 19, the electric voltage at the ends of the two poles 21 and 22, the intensity of the electric current flowing through the two poles 21 and 22, and/or the temperature of the corresponding electrochemical cell; moreover, the control unit uses the above information to manage the chemical batteries 19, i.e. to determine how to distribute the energy entering and exiting the battery module 25 among all the chemical batteries 19 forming said battery module 25.

Lastly, as shown in FIGS. 6 and 7, each battery module 25 comprises two tie rods 36, which are arranged on opposite sides of the battery module 25 and tie together the cooling device 34, the lids 32, the support bodies 28 and the local control unit 35 in a packed manner. In particular, the tie rods 36 are arranged on the outside of the cooling device 34, the lids 32, the support bodies 28 and the local control unit 35, i.e. they rest against opposite outer side surfaces of the cooling device 34, the lids 32, the support bodies 28 and the local control unit 35. According to a preferred embodiment illustrated in the attached figures (and best seen in FIGS. 17 and 18), the tie rods 36 comprise wedge-shaped protrusions which engage by elastic deformation in corresponding through seats formed in the support bodies 28, the cooling device 34 and the local control unit 35, so as to achieve mechanical joints which hold together the battery module 25 with a certain compression.

As the two support bodies 28 are mutually separated by the chemical batteries 19 (i.e. the two support bodies 28 do not touch each other due to the interposition of the chemical batteries 19), the thrust generated by the two tie rods 36 tends to push the two support bodies 28 towards one another and is also released onto the chemical batteries 19 which are then mechanically peak loaded. In other words, the two support bodies 28 have, as the sole mutual connection, the tie rods 36, which tend to push the two support bodies 28 towards one another, and the batteries 19, which are interposed between the two support bodies 28 and thus maintain said support bodies 28 separate from one another.

Figure 22:
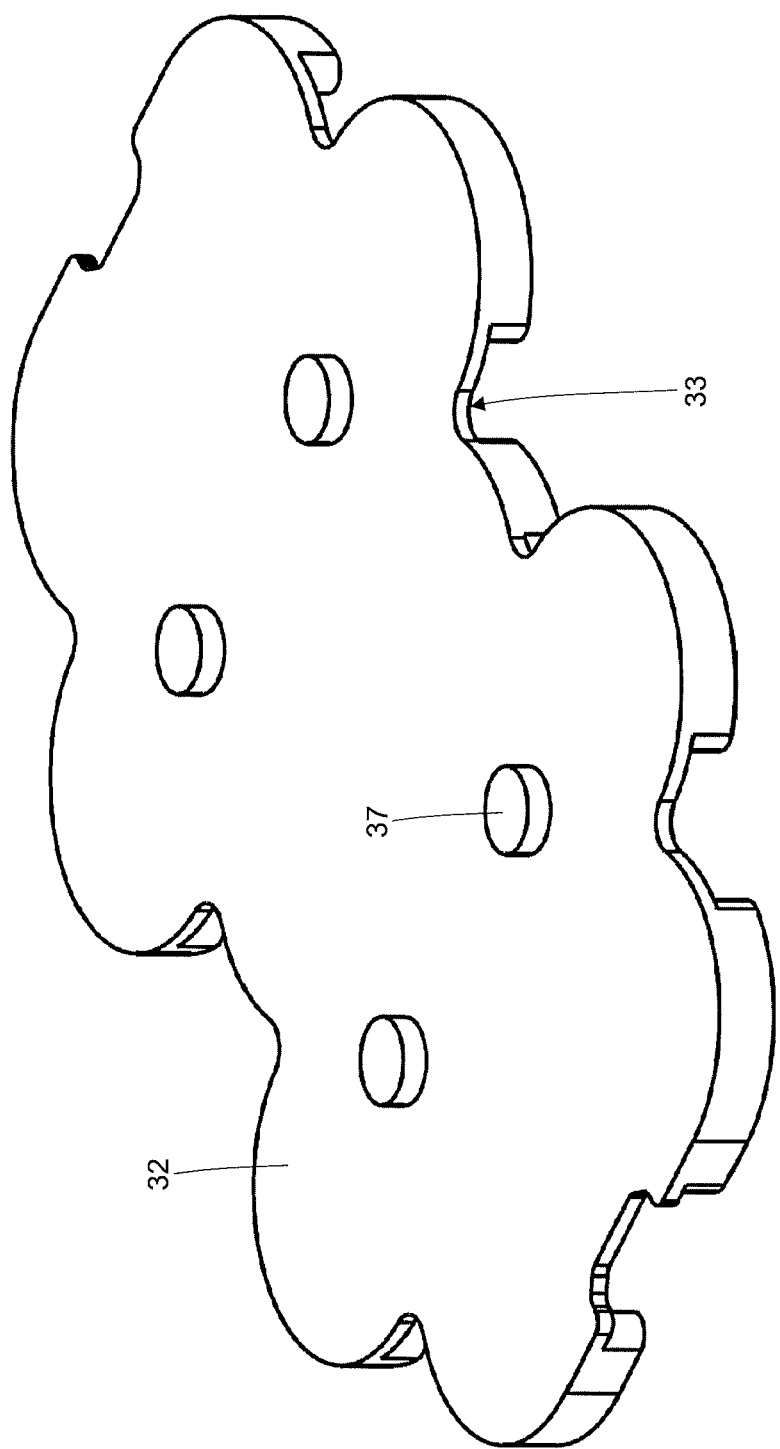
FIGS. 22 and 23 are two perspective views of a lid of the battery module of FIGS. 6 and 7.
Figure 24:
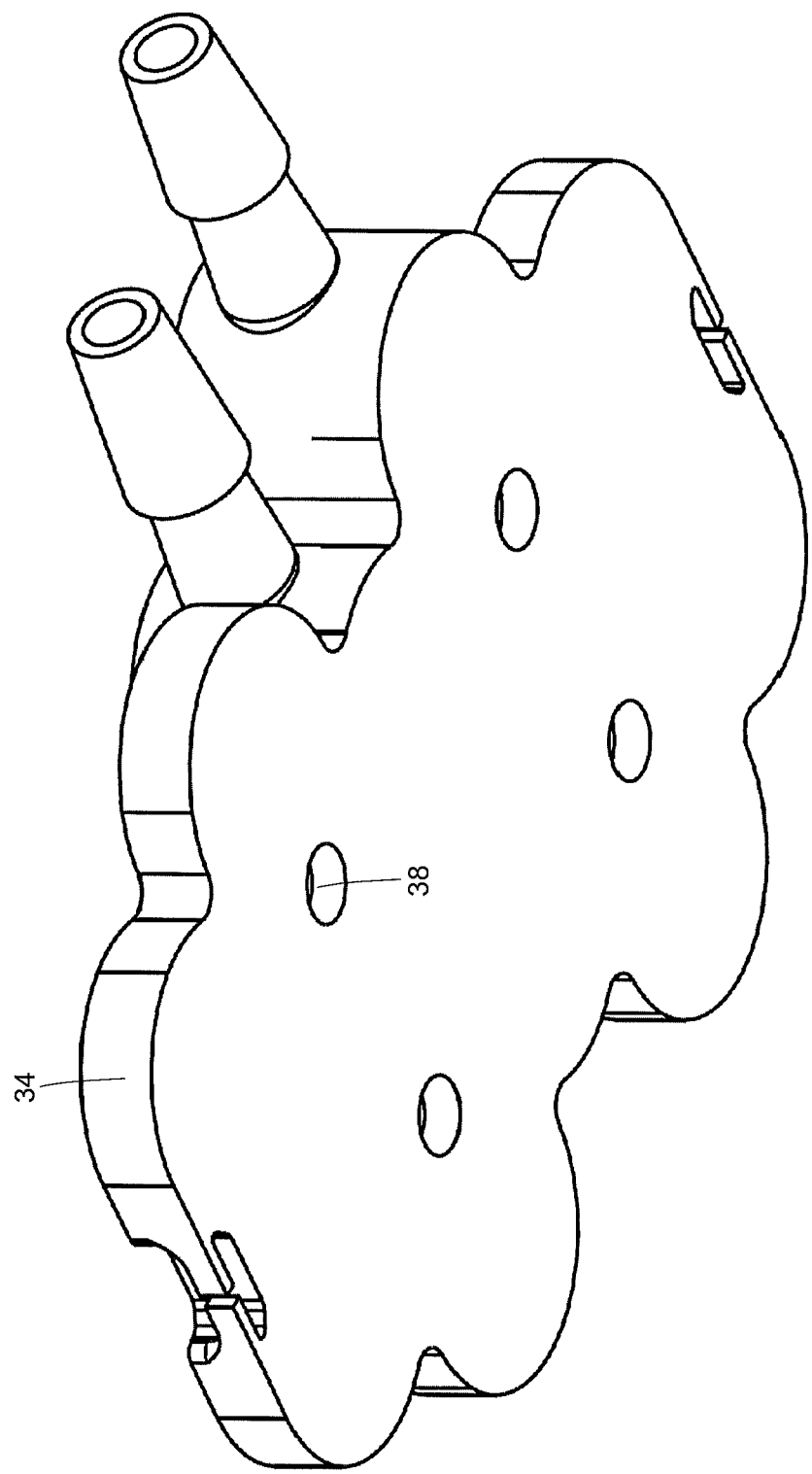
FIG. 24 is a perspective view of a cooling device of the battery module of FIGS. 6 and 7.

According to a preferred embodiment illustrated in FIGS. 22 and 24, a mechanical interlocking system is provided between the cooling device 34 and the corresponding lid 32; this interlocking system comprises a plurality of pins 37 (shown in FIG. 22), which protrude from the outer surface of the corresponding lid 32, and a plurality of dead holes 38 (shown in FIG. 24), which are formed in an inner surface of the cooling device 34 and are designed to house the pins 37.

Figure 25:
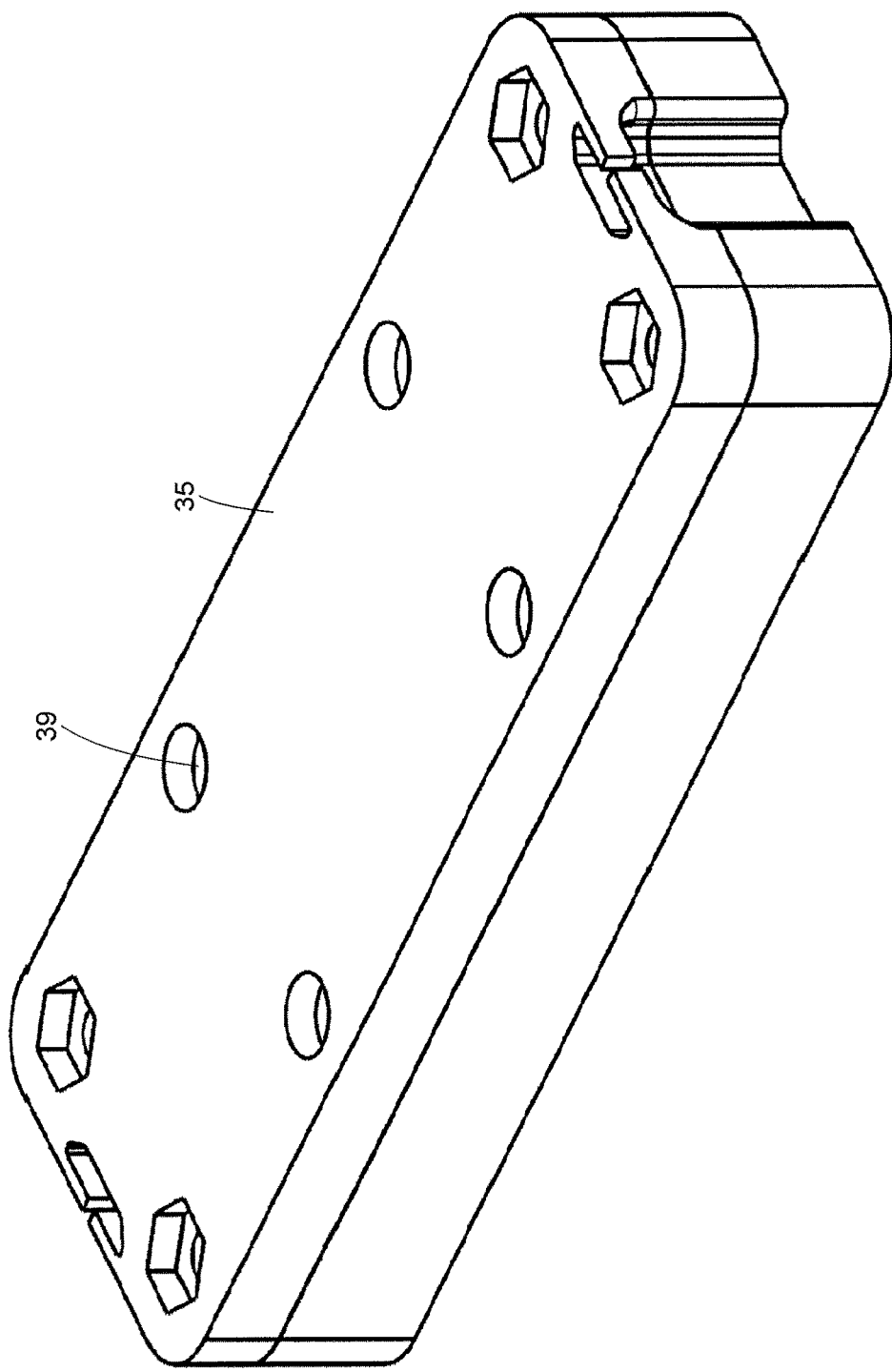
FIG. 25 is a perspective view of a control unit of the battery module of FIGS. 6 and 7.

According to a preferred embodiment illustrated in FIGS. 22 and 25, a mechanical interlocking system is provided between the local control unit 35 and the corresponding lid 32; this interlocking system comprises a plurality of pins 37 (shown in FIG. 22), which protrude from the outer surface of the corresponding lid 32, and a plurality of dead holes 39 (shown in FIG. 25), which are formed in an inner surface of the local control unit 35 and are designed to house the pins 37.

Preferably, the two lids 32 are identical to each other (this simplifies the construction of said lids 32 that may be produced by using a single mould) and therefore have the same pins 37 in the same positions; accordingly, the position and the size of the dead holes 38 on the inner surface of the cooling device 34 must be identical to the position and size of the dead holes 39 on the inner surface of the local control unit 35.

Figure 20:
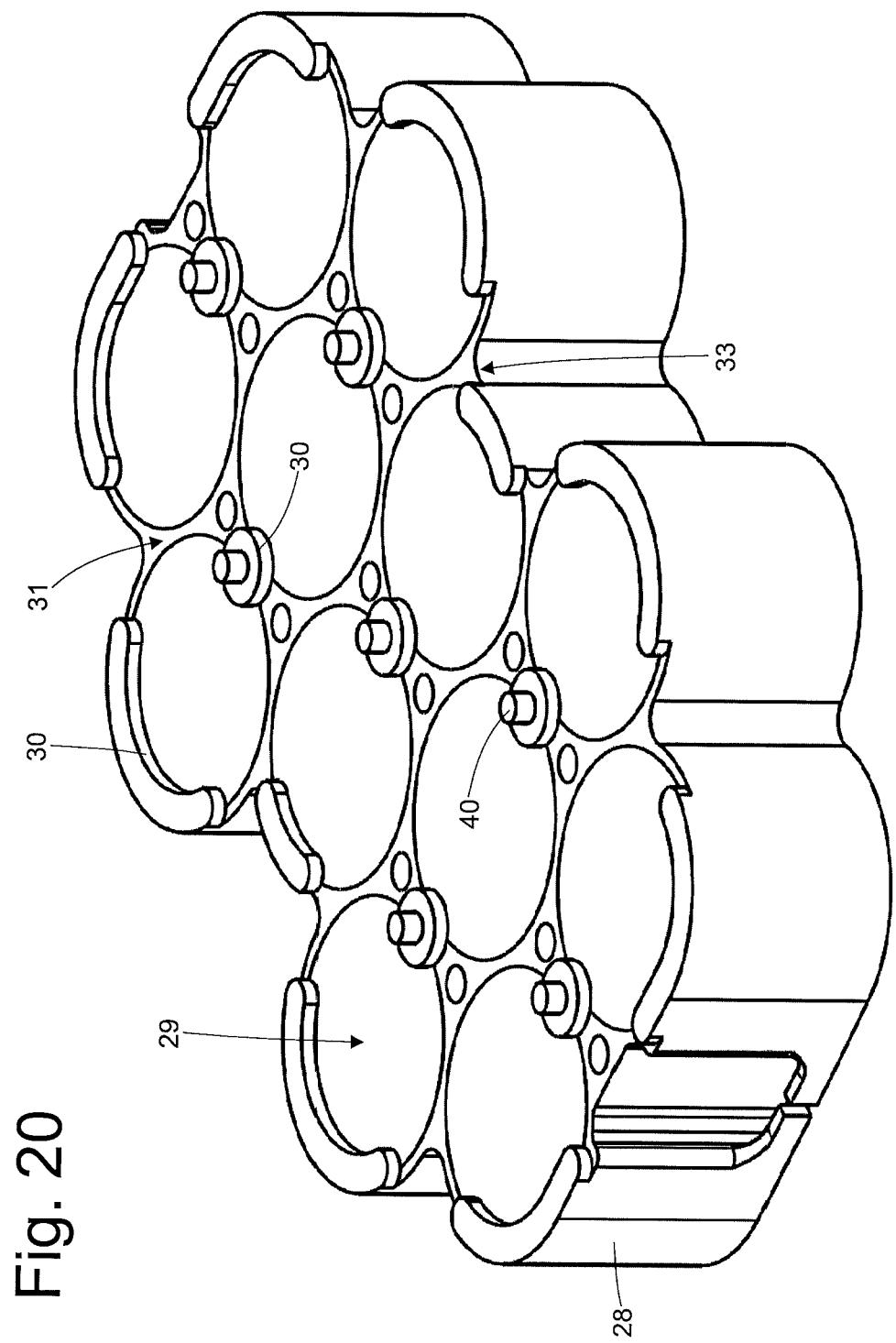
Figure 23:
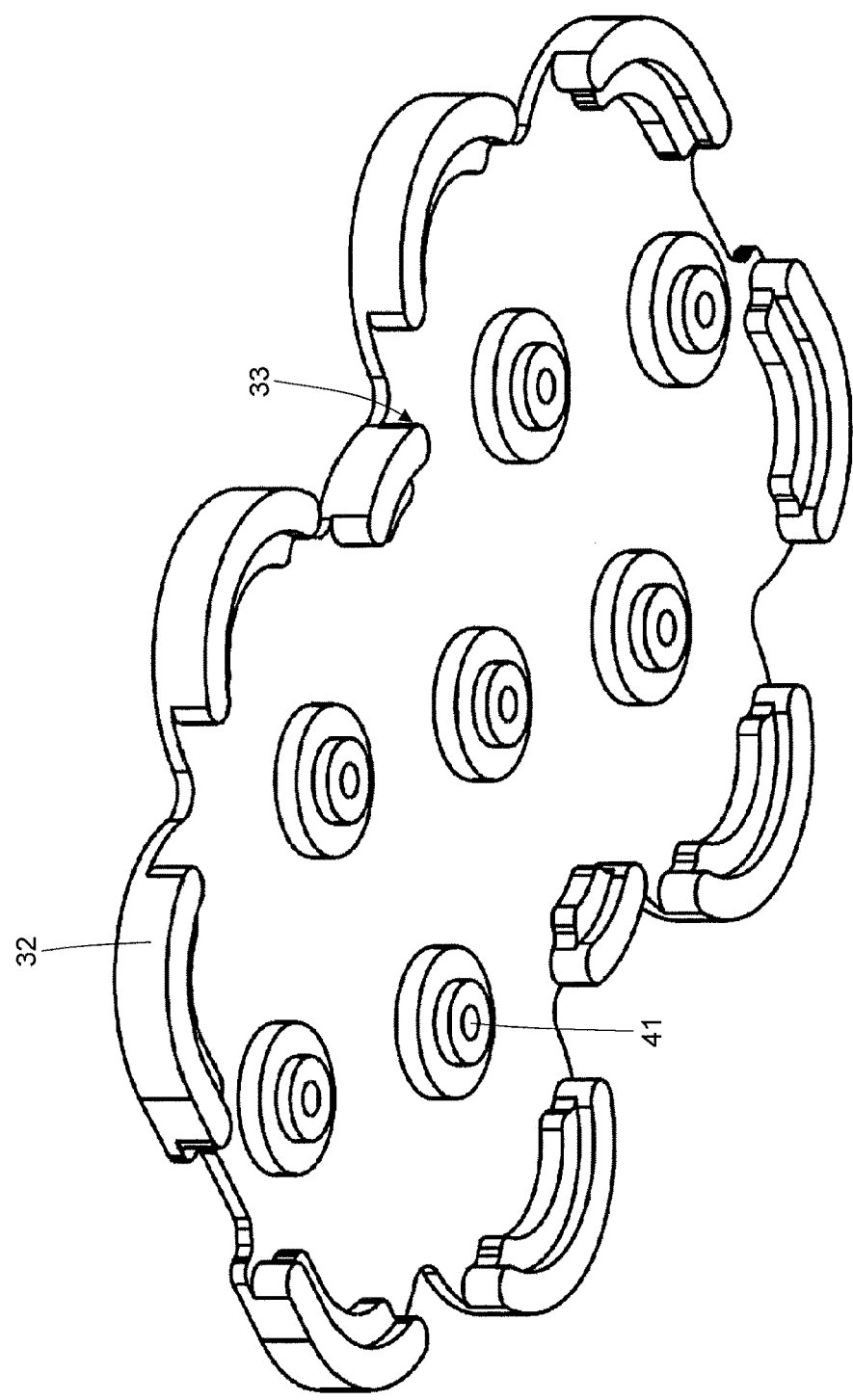

According to a preferred embodiment illustrated in FIGS. 20 and 23, a mechanical interlocking system is provided between each support body 28 and the corresponding lid 32; this interlocking system comprises a plurality of pins 40 (shown in FIG. 20), which protrude from an outer end of the corresponding support body 28, and a plurality of dead holes 41 (shown in FIG. 23), which are formed in an inner surface of the lid 32 and are designed to house the pins 40. Preferably, but not necessarily, each pin 40 rises from a corresponding centrally arranged locking element 30.

Figure 21:
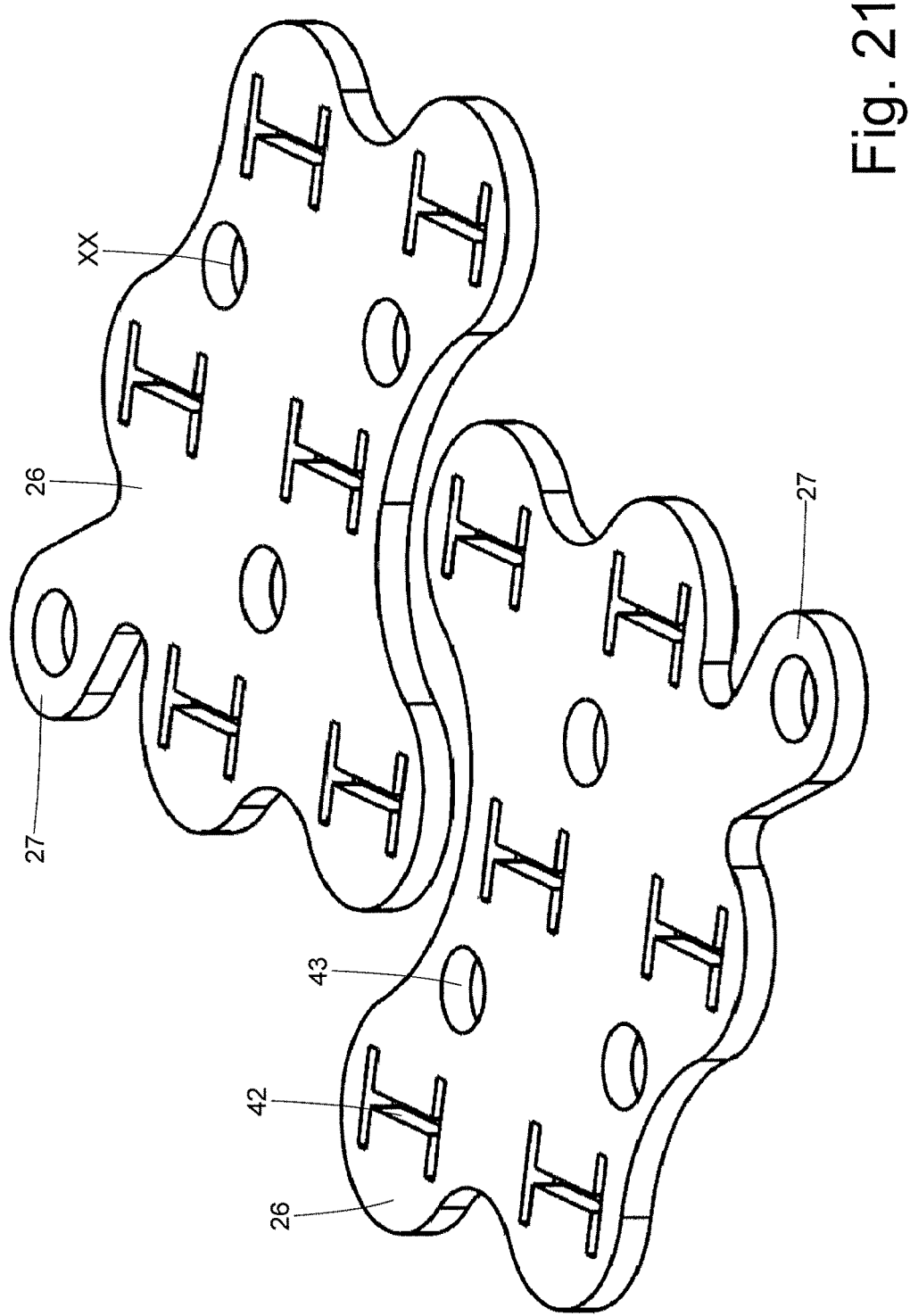
FIG. 21 is a perspective view of two connection plates of the battery module of FIGS. 6 and 7.

According to a preferred embodiment illustrated in FIG. 21, each connection plate 26 comprises, in the area of each chemical battery 19, a through vent opening 42 (preferably, but not necessarily, in the shape of an "I"); the role of the vent opening 42 is to allow the passage of the hot fluids flowing out of the safety valve 24 of the corresponding chemical battery 19 in case of thermal drift of said chemical battery 19, so that the hot fluids can easily reach the corresponding collecting chamber (from which they subsequently come out through the draining openings 33) without being retained by the connection plates 26.

Figure 9:
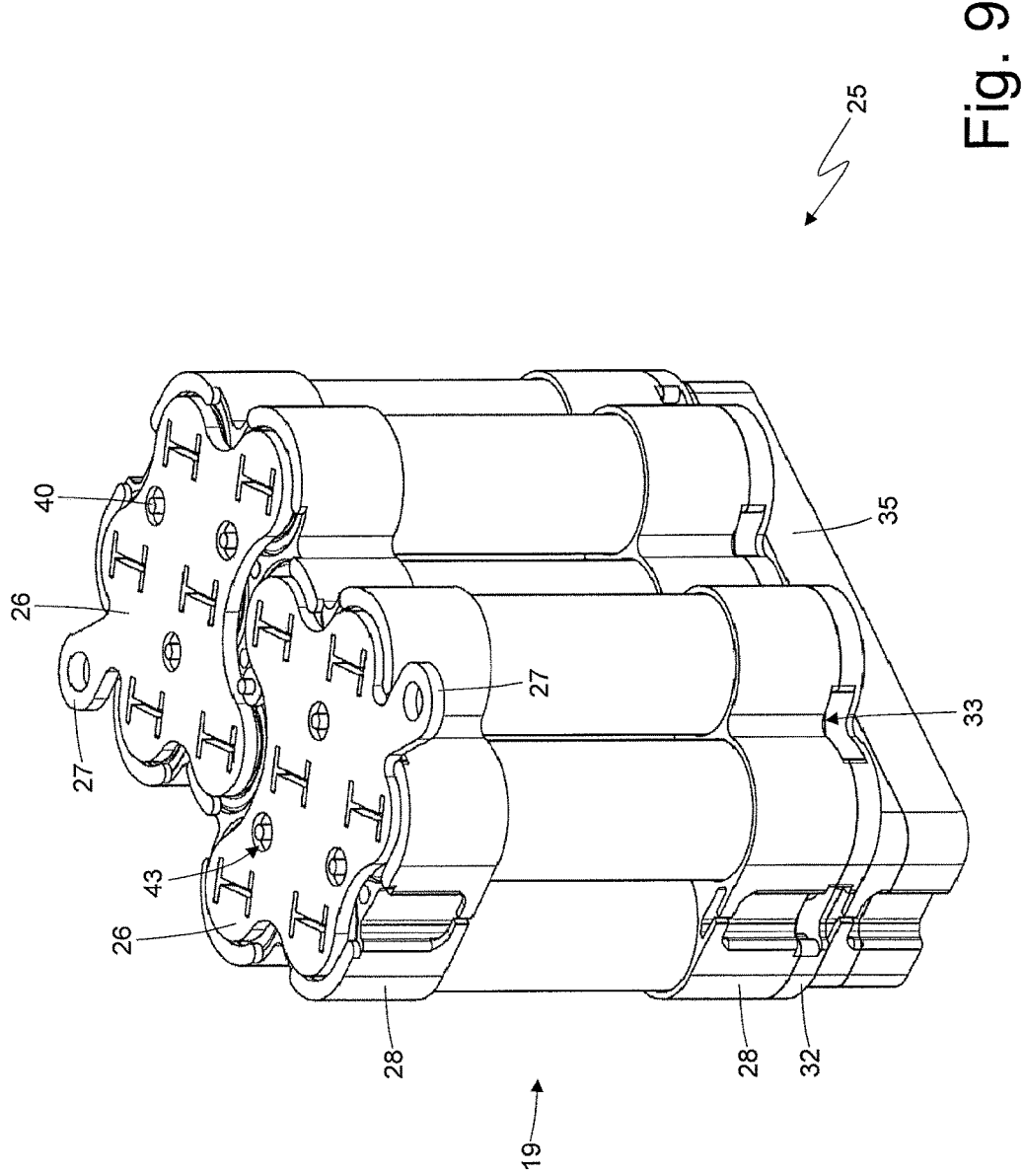
Figure 10:
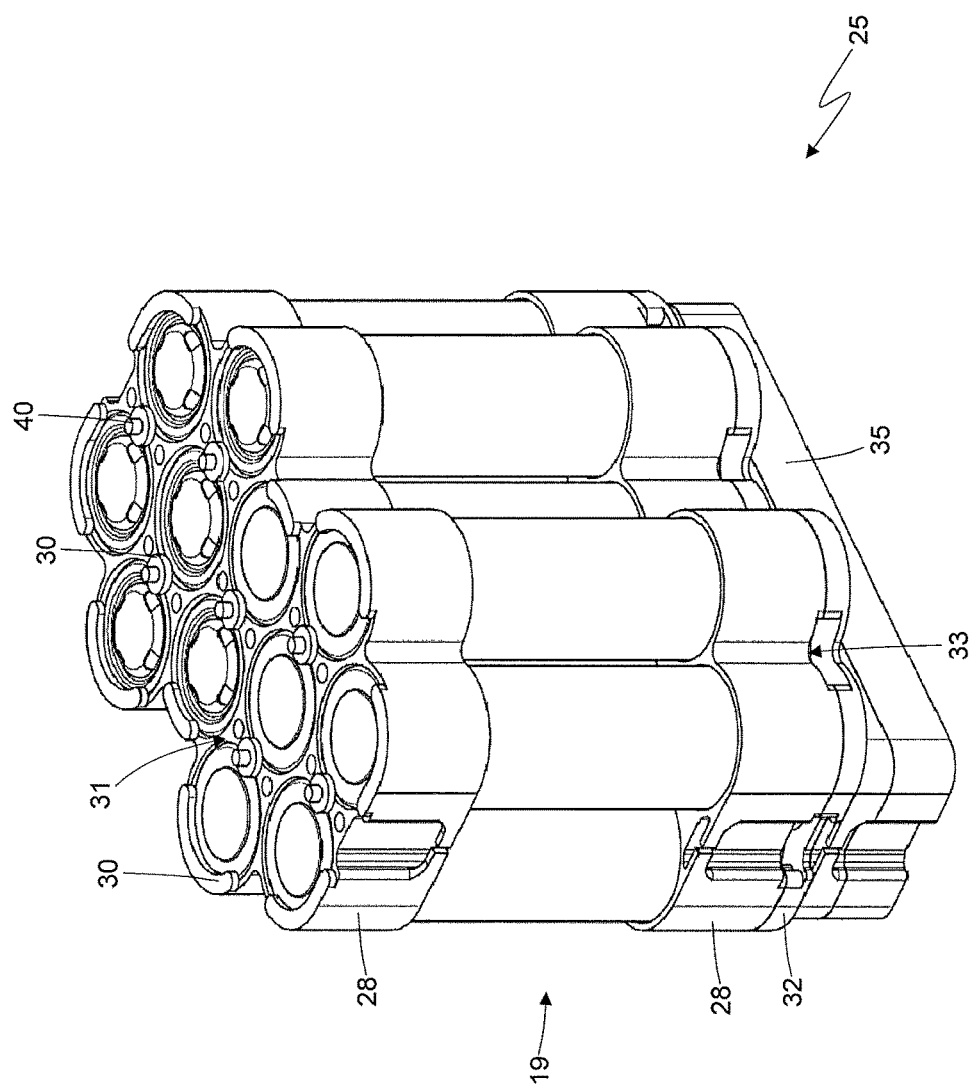
Figure 11:
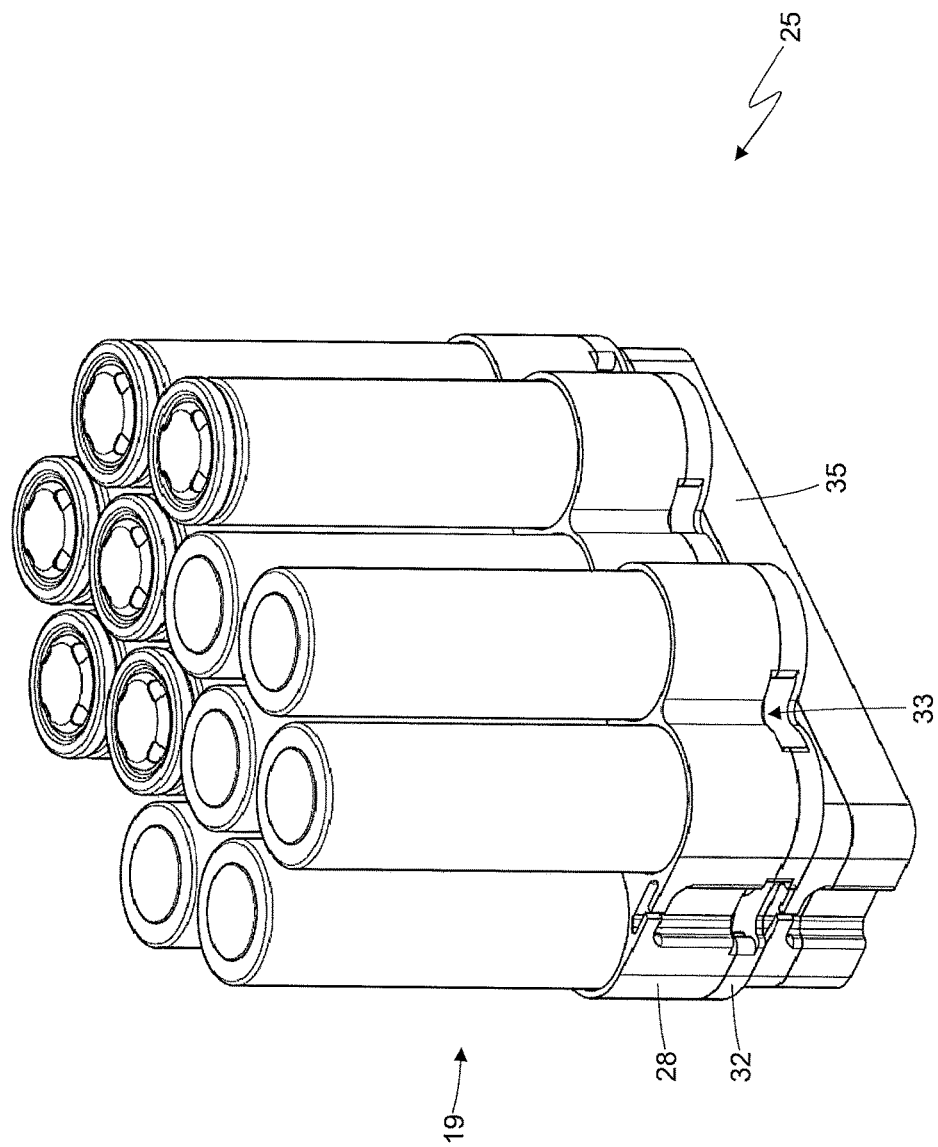
Figure 12:
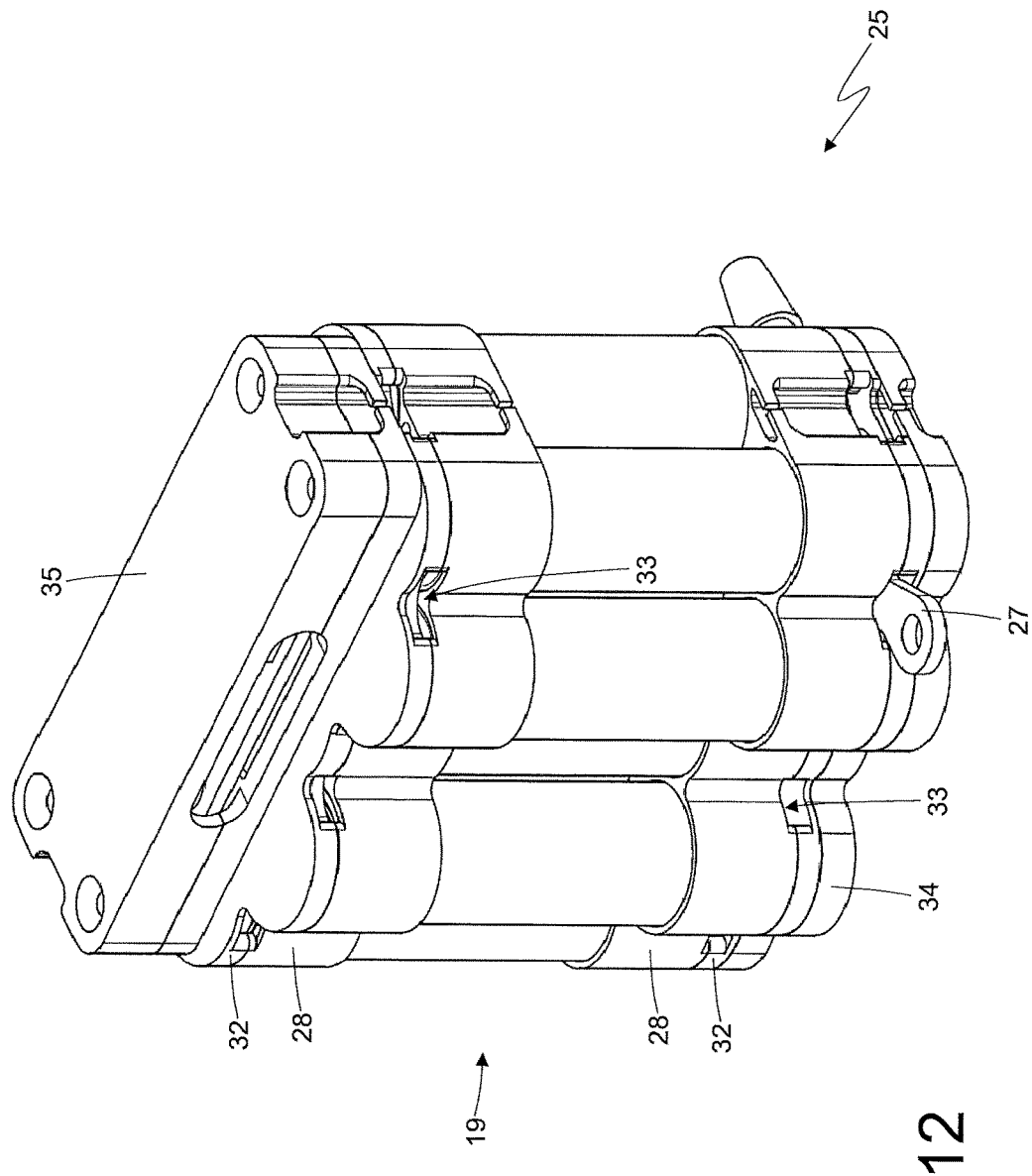
FIGS. 12 and 13 are two further perspective views of the battery module of FIGS. 6 and 7.
Figure 13:
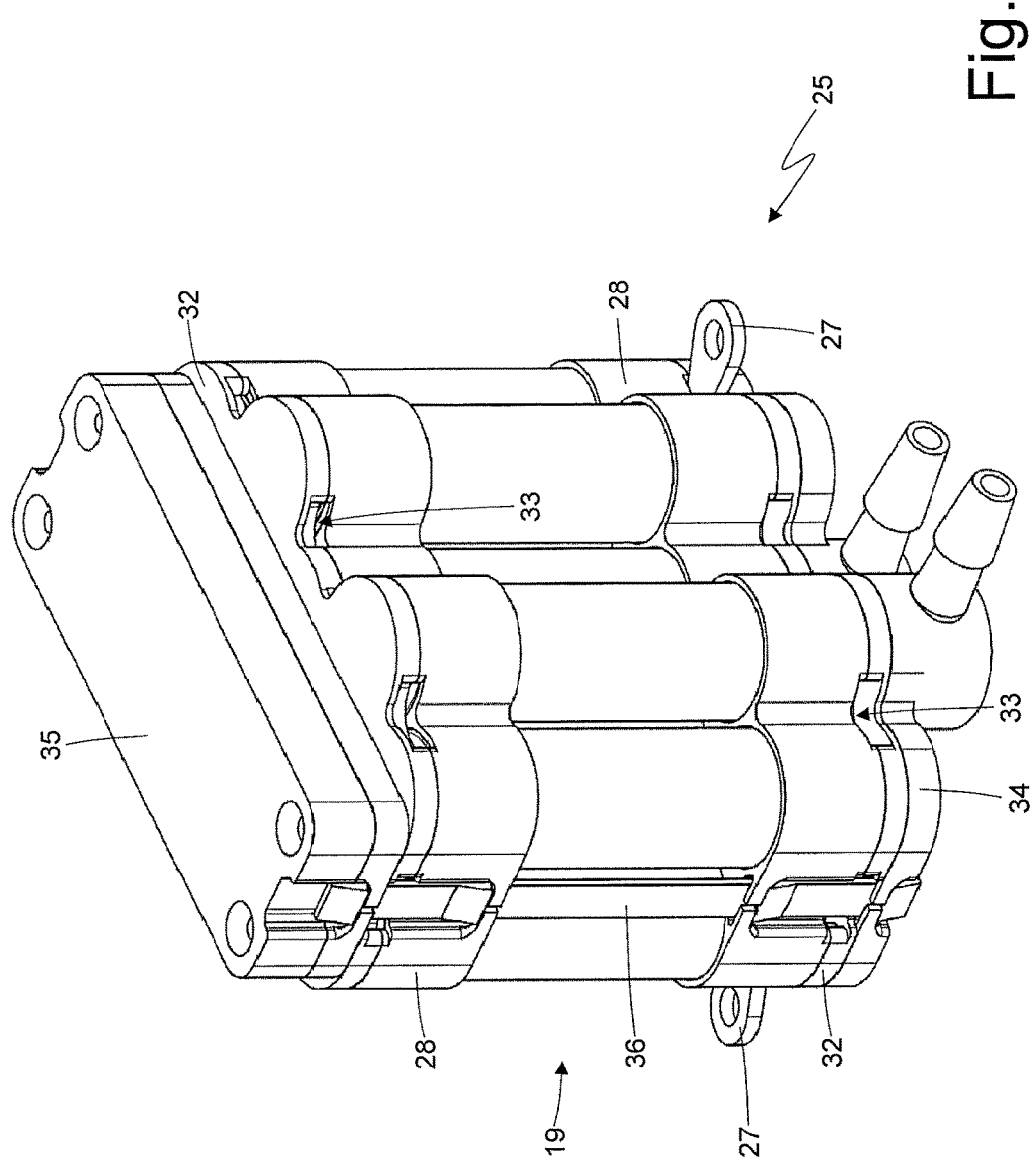
Figure 14:
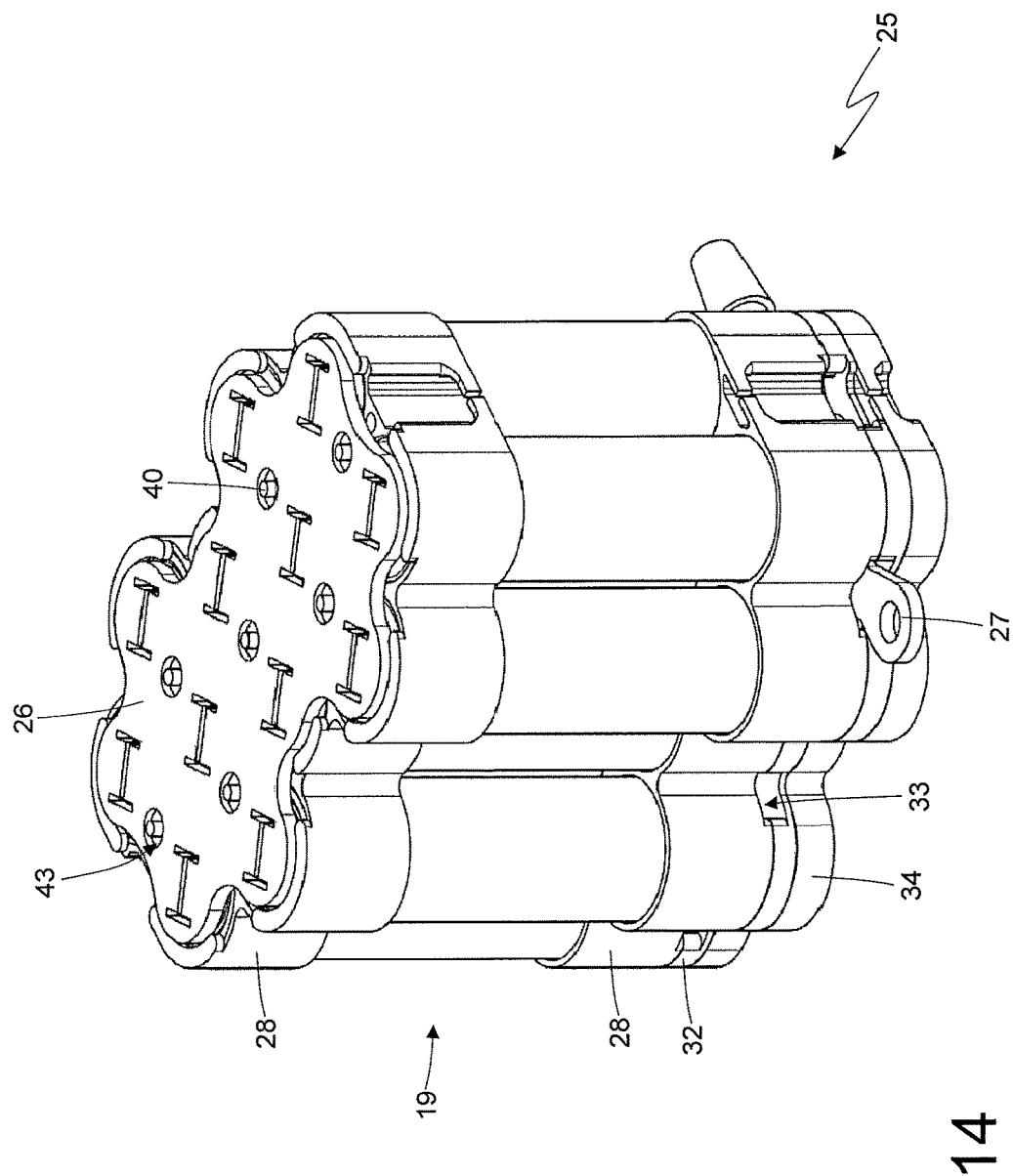
FIGS. 14, 15 and 16 are three further perspective views of the battery module of FIGS. 6 and 7 with the progressive removal of elements.
Figure 15:
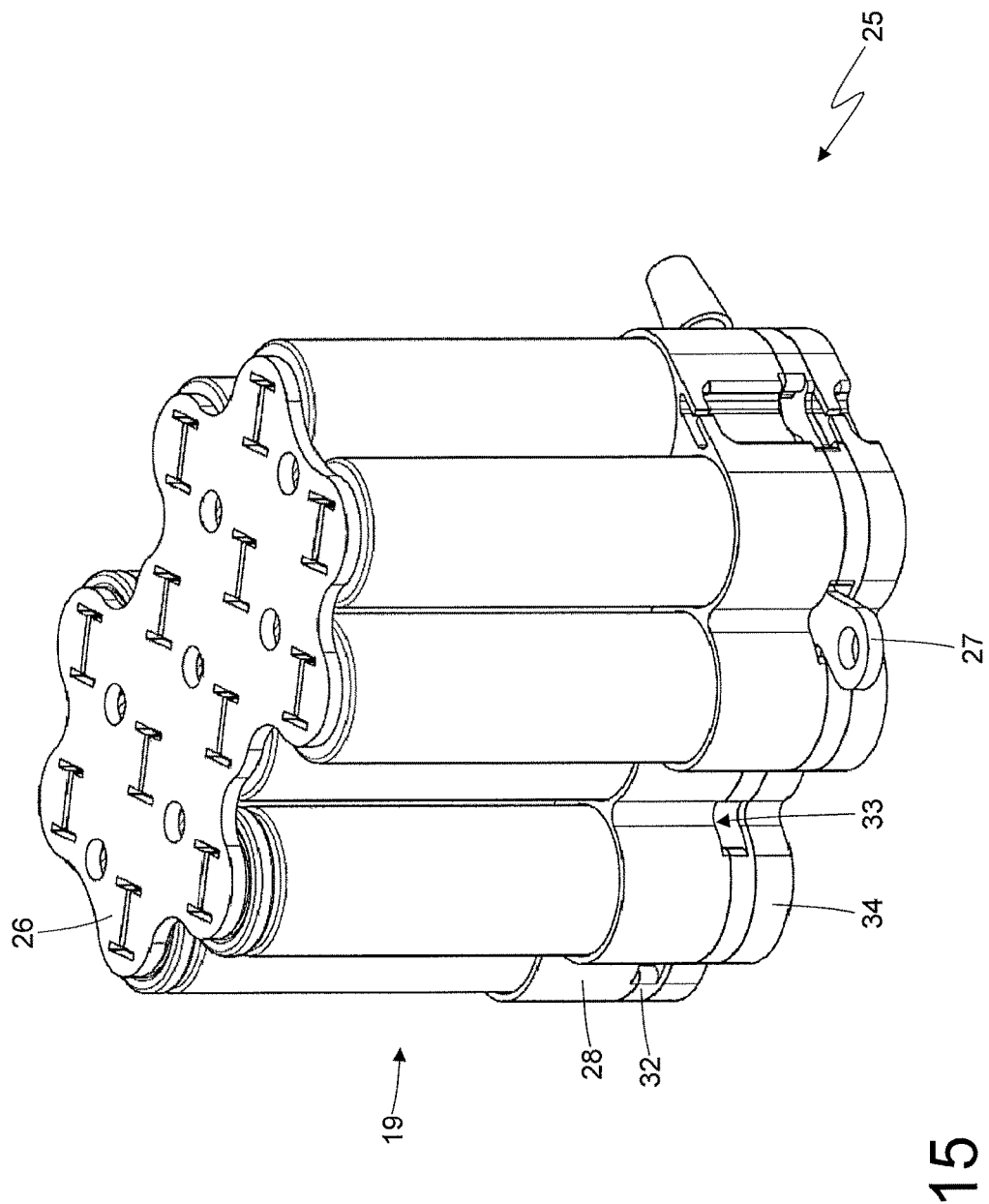
Figure 16:
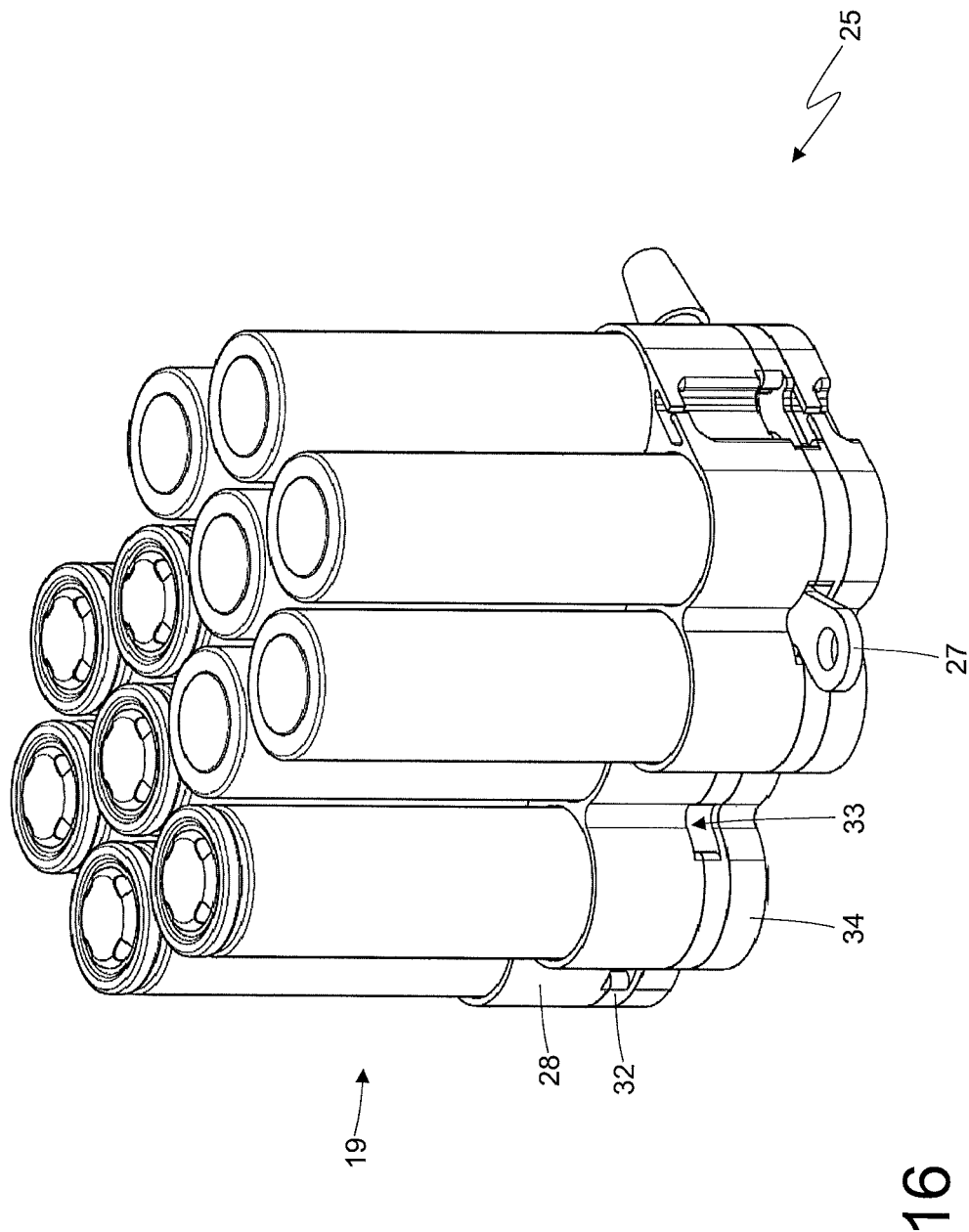
Figure 17:
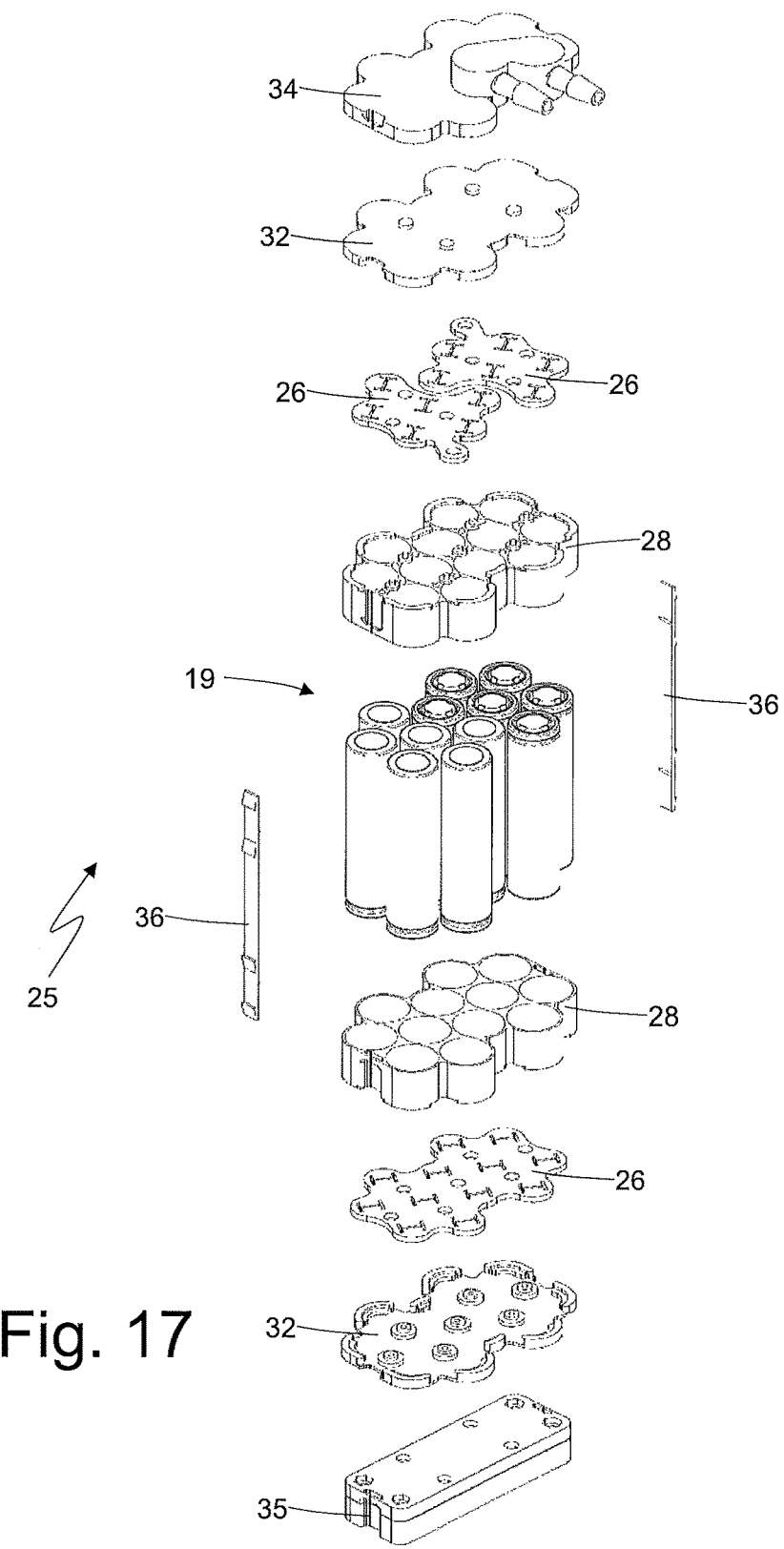
FIGS. 17 and 18 are two different exploded perspective views of the battery module of FIGS. 6 and 7.
Figure 18:
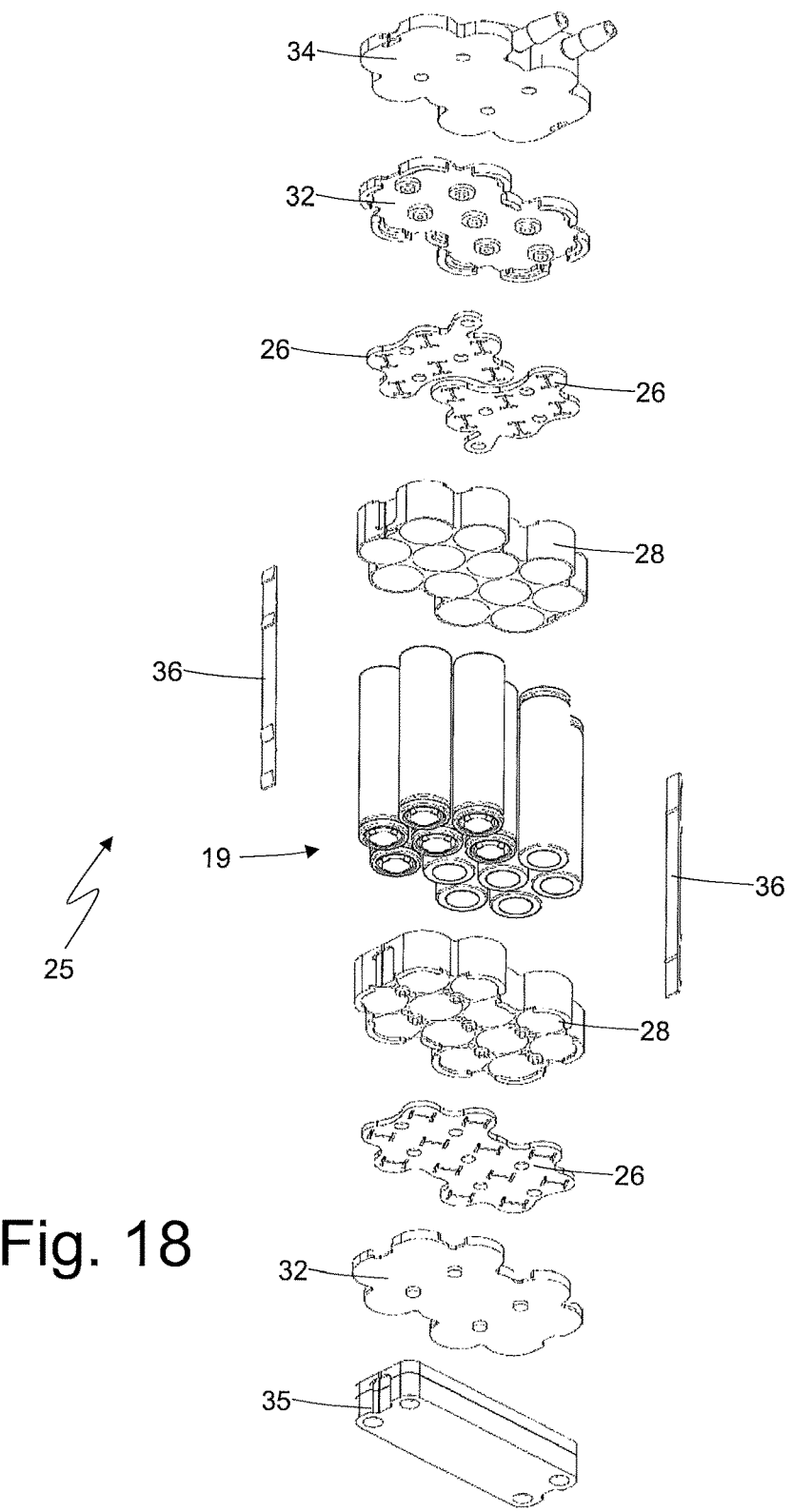

According to a preferred embodiment illustrated in FIG. 21, each connection plate 26 has a plurality of through holes 43 through which the pins 40 of the mechanical interlocking system are arranged between the corresponding support body 28 and the corresponding lid 32 (as shown in FIGS. 9 and 14).

According to a preferred embodiment, each connection plate 26 simply rests against the corresponding poles 21 and 22 of the chemical batteries 19 and has no permanent mechanical connection to the corresponding poles 21 and 22 of the chemical batteries 19; in this way, in case of breakage of the battery module 25 due to an accident, the electrical connections between the chemical batteries 19 are cut off (because the connection plates 26, devoid of stable connections with the poles 21 and 22 of the chemical batteries 19, separate from the poles 21 and 22 of said chemical batteries 19), thereby reducing the risk of exposing people to dangerous electrical voltages (the electrical voltage of the individual chemical batteries 19 is up to a few tens of volts and thus is not dangerous and only becomes dangerous when it is multiplied by the series connection of multiple chemical batteries 19). In other words, after the impact, many chemical batteries 19 are not connected to each other, so individually they have a low electrical voltage and are not dangerous.

According to an alternative embodiment, each connection plate 26 is welded to the poles 21 and 22 of the corresponding chemical batteries 19 by means of a low mechanical strength filler material (for example by means of tin).

To ensure an adequate electrical connection between each connection plate 26 and the corresponding poles 21 and 22 of the chemical batteries 19, the corresponding lid 32 presses said connection plate 26 against the corresponding poles 21 and 22 of the chemical batteries 19 with a predetermined pressure (and generated by the tightening action exerted by the tie rods 36).

According to a preferred embodiment, the support bodies 28 of each battery module 25 have a mechanical strength that is smaller than the mechanical strength of the individual chemical batteries 19 and is adjusted so as to deform in case of crash. In this way, in case of a violent accident, the battery modules 25 break, leaving the chemical batteries 19 free (and electrically disconnected from each other), which then can disperse without being subjected to excessively high pressures (which otherwise could cause the explosion of said chemical batteries 19). In other words, the support bodies 28 of each battery module 25 are sized to have a sufficiently high mechanical strength (with an adequate safety margin) to withstand the stresses from normal driving (resulting from both accelerations and vibrations), but not high enough to withstand the stresses that occur in the event of an impact (obviously of a certain gravity, not, for example, a simple low speed nose-to-tail crash). In any case, it is essential that the mechanical strength of the support bodies 28 of each battery module 25 is (considerably) lower than the mechanical strength of the individual chemical batteries 19, since, in case of a serious impact, it is acceptable (or rather, it is desirable) that the support bodies 28 get deformed (normally getting broken), while leaving the individual chemical batteries 19 intact.

According to a preferred embodiment, the storage system 14 comprises a central control unit (called BMS—"Battery Management System"), which controls the whole storage system 14, and a plurality of local control units 35 (called BMC—"Battery Module Control"), which are connected to the central control unit. Each local control unit 35 is associated with a corresponding group of chemical batteries 19, controls the operation of its own chemical batteries 19, and operates in a master-slave mode with the central control unit.

In the storage system 14 there are drain pipes, which run between the battery modules 25, connect to all the draining openings 33, and lead to the outside of the road vehicle 1 (typically through an underbody of the road vehicle 1 so as to lead to the road surface); these drain pipes serve the purpose of collecting and discharging the hot fluids flowing out of the draining openings 33 in case of thermal drift of one or more chemical batteries 19.

In the storage system 14 there are (rigid or flexible) electrical connections that run between the battery modules 25 and electrically connect the terminals 27 of all the battery modules 25.

The battery module 25 described above has many advantages.

In the first place, the limited size of the battery module 25 described above allows to "construct" the storage system 14 so as to also obtain "irregular" shapes (i.e. "complex" shapes) in a simple way, in order to adapt the shape of the storage system 14 to the shape of the available space inside the road vehicle 1, so that the available space is taken up as fully as possible.

In addition, the battery module 25 described above is simple and economical to manufacture, as the support bodies 34 28, the lids 32, and the outer shells of the cooling device and of the control unit 35 can be easily produced by plastic moulding, while the connection plates 26 can be easily produced by shearing a flat plate. Lastly, the assembly and disassembly of the battery module 25 described above are quick and simple (hence easily automated), since the entire battery module 25 is held together by two tie rods 36 which are kept in position by mechanical joints. Therefore, if the battery module 25 described above needs maintenance (e.g. to replace a faulty chemical battery 19), the operation can be performed very quickly with the use of few conventional tools.

What is claimed is:

1. A battery module for a system for the storage of electrical energy for an electric drive vehicle, the battery module comprising:
    a group of chemical batteries arranged parallel to and beside one another, each of which has a cylindrical shape, a positive pole at one end and a negative pole at an opposite end, and a safety valve at one end;
    at least two connection plates, which rest against opposite ends of the group of chemical batteries, so as to electrically connect the poles of the chemical batteries to one another, and are provided with two respective terminals, which project outwards from the battery module and are designed to establish an external electrical connection of the battery module;
    two support bodies coupled to opposite ends of the group of chemical batteries so as to provide the chemical batteries with a stable mechanical support, each having: a plurality of tubular seats, which house, on the inside, the chemical batteries, a plurality of locking elements, which are arranged in the area of an outer surface of the support body and hold the chemical batteries inside the corresponding tubular seats, and a flat seat, which is arranged in the area of the outer surface of the support body and houses at least one corresponding connection plate;
    two lids, which are coupled to the support bodies so as to create respective collecting chambers having at least one draining opening to drain hot fluids flowing out of the safety valve of a chemical battery in case of thermal drift of the chemical battery;
    a cooling device, which is designed to remove heat and rests against the outer surface of a first lid; and at least two tie rods, which are arranged on opposite sides of the battery module, on the outside of the cooling device, the lids and the support bodies, and which tie together the cooling device, the lids and the support bodies in a packed manner;

wherein the two support bodies are mutually separated by the chemical batteries, such that the two support bodies do not touch each other due to the interposition of the chemical batteries, and therefore the thrust generated by the two tie rods tends to push the two support bodies towards one another and is also released onto the chemical batteries, which are then mechanically peak loaded.

2. A battery module according to claim 1, wherein the tie rods comprise wedge-shaped protrusions which engage by elastic deformation in corresponding through seats formed in the cooling device and in the support bodies.

3. A battery module according to claim 1, wherein a first mechanical interlocking system is provided between the cooling device and the first lid.

4. A battery module according to claim 3, wherein the first interlocking system comprises a plurality of first pins, which project from the outer surface of the first lid, and a plurality of first dead holes, which are formed in an inner surface of the cooling device and are designed to house the first pins.

5. A battery module according to claim 1 and comprising a control unit, which controls the operation of the chemical batteries, is arranged on the opposite side of the battery module with respect to the cooling device, rests against the outer surface of a second lid opposite to the first lid, and is tied, in a packed manner, by the two tie rods.

6. A battery module according to claim 5, wherein the tie rods comprise wedge-shaped protrusions which engage by elastic deformation in corresponding through seats formed in the cooling device, the control unit and in the support bodies.

7. A battery module according to claim 5, wherein a second mechanical interlocking system is provided between the control unit and the second lid.

8. A battery module according to claim 7, wherein the second interlocking system comprises a plurality of second pins, which project from the outer surface of the second lid, and a plurality of second dead holes, which are formed in an inner surface of the control unit and are designed to house the second pins.

9. A battery module according to claim 1, wherein each connection plate comprises, in the area of each chemical battery, a through vent opening which is "I"-shaped.

10. A battery module according to claim 1, wherein:
the locking elements of each support body are arranged in the area of an outer end of the support body and prevent the chemical batteries from coming out of the outer end of the support body; and
at least some locking elements are arranged astride two adjacent tubular seats.

11. A battery module according to claim 1, wherein:
a third mechanical interlocking system is provided between each support body and the corresponding lid; and
each third interlocking system comprises a plurality of third pins, which project from an outer end of the corresponding support body, and a plurality of third dead holes, which are formed in an inner surface of the corresponding lid and are designed to house the third pins.

12. A battery module according to claim 11, wherein each connection plate has a plurality of through holes, through which the third pins are arranged.

13. A battery module according to claim 1, wherein each terminal of a connection plate projects from the corresponding collecting chamber through a draining opening.

14. A battery module according to claim 1, wherein each lid presses the corresponding connection plates against the corresponding poles of the chemical batteries with a predetermined pressure.

15. A battery module according to claim 1, wherein each connection plate simply rests against the corresponding poles of the chemical batteries and has no permanent mechanical connection to the corresponding poles of the chemical batteries.

16. A battery module according to claim 1, wherein the support bodies have a mechanical strength that is smaller than the mechanical strength of the individual chemical batteries and is adjusted so as to deform in case of crash.

17. A battery module for a system for the storage of electrical energy for an electric drive vehicle, the battery module comprising:
a group of chemical batteries arranged parallel to and beside one another, each of which has a cylindrical shape, a positive pole at one end and a negative pole at an opposite end, and a safety valve at one end;
at least two connection plates, which rest against opposite ends of the group of chemical batteries, so as to electrically connect the poles of the chemical batteries to one another, and are provided with two respective terminals, which project outwards from the battery module and are designed to establish an external electrical connection of the battery module;
two support bodies coupled to opposite ends of the group of chemical batteries so as to provide the chemical batteries with a stable mechanical support, each having a plurality of tubular seats, which house, on the inside, the chemical batteries, a plurality of locking elements, which are arranged in the area of an outer surface of the support body and hold the chemical batteries inside the corresponding tubular seats, and a flat seat, which is arranged in the area of the outer surface of the support body and houses at least one corresponding connection plate; and
two lids, which are coupled to the support bodies so as to create respective collecting chambers having at least one draining opening to drain hot fluids flowing out of the safety valve of a chemical battery in case of thermal drift of the chemical battery; and
at least two tie rods provided, which are arranged on opposite sides of the battery module, on the outside of the lids and the support bodies, and tie together the lids and the support bodies in a packed manner;
wherein the two support bodies are mutually separated by the chemical batteries, such that the two support bodies do not touch each other due to the interposition of the chemical batteries, and therefore the thrust generated by the two tie rods tends to push the two support bodies towards one another and is also released onto the chemical batteries, which are then mechanically peak loaded.

* * * * *